(12) United States Patent
Di Teodoro et al.

(10) Patent No.: US 7,876,803 B1
(45) Date of Patent: Jan. 25, 2011

(54) HIGH-POWER, PULSED RING FIBER OSCILLATOR AND METHOD

(75) Inventors: Fabio Di Teodoro, Torrance, CA (US); Tracy W. Vatter, Monroe, WA (US); Christopher D. Brooks, Kenmore, WA (US); Robert W. Royse, Jr., Kirkland, WA (US); Matthias P. Savage-Leuchs, Seattle, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/053,551

(22) Filed: Mar. 21, 2008

Related U.S. Application Data

(60) Provisional application No. 60/896,265, filed on Mar. 21, 2007.

(51) Int. Cl.
*H01S 3/083* (2006.01)
(52) U.S. Cl. .................................. 372/94; 372/6; 372/10
(58) Field of Classification Search .................. 372/6, 372/94, 10
See application file for complete search history.

(56) References Cited

U.S. PATENT DOCUMENTS

| | | | |
|---|---|---|---|
| 4,728,168 A * | 3/1988 | Alferness et al. | 385/41 |
| 5,828,682 A * | 10/1998 | Moores | 372/26 |
| 6,288,835 B1 | 9/2001 | Nilsson | |
| 7,372,880 B2 * | 5/2008 | Jablonski et al. | 372/30 |
| 7,397,832 B2 * | 7/2008 | Dell'Acqua et al. | 372/39 |
| 2004/0114641 A1 * | 6/2004 | Wise et al. | 372/6 |
| 2005/0238066 A1 * | 10/2005 | Liu | 372/6 |
| 2006/0133432 A1 | 6/2006 | Dragic | |

* cited by examiner

*Primary Examiner*—Tod T Van Roy
(74) *Attorney, Agent, or Firm*—Charles A. Lemaire; Jonathan M. Rixen; Lemaire Patent Law Firm, P.L.L.C.

(57) ABSTRACT

A ring laser includes a large-core rare-earth-doped fiber ring-connected with a free-space path having an electro-optic switch, output coupler, and intracavity band-pass filter to enforce lasing operation in narrow wavelength range. In some cavity-dumped modes, the laser is configured in a similar manner, except that an output coupler is omitted since the optical power is extracted from the laser cavity by the electro-optic switch itself. The same laser can be configured to operate in Q-switched and/or cavity-dumping modes as well as in hybrid modes (e.g., partial Q-switch, followed by cavity dumping, or even CW). In some embodiments, the laser can be used as, or inject laser light into, a regenerative solid-state amplifier, or a Raman laser, or can be also used to generate visible, ultra-violet, mid-infrared, and far-infrared (THz) radiation via nonlinear wavelength conversion processes. The various embodiments can use a power oscillator or seed-plus-amplifier MOPA configuration.

43 Claims, 17 Drawing Sheets

HIGH-POWER, PULSED RING FIBER OSCILLATOR AND METHOD

CROSS-REFERENCE TO RELATED APPLICATIONS

This application claims benefit of U.S. Provisional Patent Application 60/896,265 filed on Mar. 21, 2007, titled "HIGH-POWER, PULSED RING FIBER OSCILLATOR," which is incorporated herein by reference in its entirety.

This invention is related to U.S. patent application Ser. No. 11/257,793 filed Oct. 24, 2005 and titled "APPARATUS AND METHOD FOR OPTICAL STIMULATION OF NERVES AND OTHER ANIMAL TISSUE" (now U.S. Pat. No. 7,736,382, issued Jun. 15, 2010 to James S. Webb et al.);

U.S. patent application Ser. No. 11/536,639 filed Sep. 28, 2006 and titled "MINIATURE APPARATUS AND METHOD FOR OPTICAL STIMULATION OF NERVES AND OTHER ANIMAL TISSUE";

U.S. Provisional Patent Application Ser. No. 60/872,930 filed Dec. 4, 2006 and titled "APPARATUS AND METHOD FOR CHARACTERIZING OPTICAL SOURCES USED WITH HUMAN AND ANIMAL TISSUES";

U.S. patent application Ser. No. 11/536,642 filed Sep. 28, 2006 and titled "APPARATUS AND METHOD FOR STIMULATION OF NERVES AND AUTOMATED CONTROL OF SURGICAL INSTRUMENTS";

U.S. Provisional Patent Application Ser. No. 60/884,619 filed Jan. 11, 2007 and titled "VESTIBULAR IMPLANT USING INFRARED NERVE STIMULATION";

U.S. patent application Ser. No. 12/018,193 titled "HIGH-ENERGY EYE-SAFE PULSED FIBER AMPLIFIERS AND SOURCES OPERATING IN ERBIUM'S L-BAND" filed Jan. 9, 2008;

U.S. patent application Ser. No. 11/971,874 titled "METHOD AND VESTIBULAR IMPLANT USING OPTICAL STIMULATION OF NERVES" filed Jan. 9, 2008;

U.S. Provisional Patent Application Ser. No. 60/894,679 filed Mar. 13, 2007 and titled "FRACTIONAL PHOTOLYSIS USING A SUB-MICROSECOND PULSED FIBER LASER";

U.S. patent application Ser. No. 12/077,083 titled "FRACTIONAL PHOTOLYSIS USING SUB-MICROSECOND PULSED FIBER LASER(S)" filed Mar. 13, 2008;

U.S. patent application Ser. No. 12/050,937 titled "A METHOD AND MULTIPLE-MODE DEVICE FOR HIGH-POWER SHORT-PULSE-LASER ABLATION AND CW CAUTERIZATION OF BODILY TISSUES" filed Mar. 18, 2008;

U.S. patent application Ser. No. 11/484,358 titled "APPARATUS AND METHOD FOR PUMPING AND OPERATING OPTICAL PARAMETRIC OSCILLATORS USING DFB FIBER LASERS" filed Jul. 10, 2006 (now U.S. Pat. No. 7,620,077, issued Nov. 17, 2009 to Angus J. Henderson);

U.S. patent application Ser. No. 11/558,362 titled "ULTRAVIOLET LASER SYSTEM AND METHOD HAVING WAVELENGTH IN THE 200-NM RANGE" filed Dec. 27, 2006 (now U.S. Pat. No. 7,471,705, issued Dec. 30, 2008 to David C. Gerstenberger et al.); and U.S. patent application Ser. No. 11/420,729 titled "FIBER-OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" filed May 26, 2006 (now U.S. Pat. No. 7,391,561, issued Jun. 24, 2008 to Fabio Di Teodoro et al.), which are all incorporated herein in their entirety by reference.

FIELD OF THE INVENTION

The invention relates generally to lasers and more particularly to Q-switched fiber ring lasers that can output high-peak-power pulses (well over a kiloWatt (kW)), in a first output beam having a first signal wavelength (e.g., in some embodiments, about 1064 nm (in the infrared)). Optionally, in some embodiments, the first output beam is passed through a wavelength-conversion device to generate one or more additional output beams at one or more different wavelengths (e.g., in some embodiments, a frequency doubler to obtain output pulses having a wavelength of about 532 nm (in the green portion of the visible spectrum)).

BACKGROUND OF THE INVENTION

The current state-of-the-art lasers for outputting high-power green light are very costly. Similarly, very high-power pulsed infrared (IR) lasers can be quite costly, making impractical their use with low-cost frequency-conversion optical devices.

U.S. patent application Ser. No. 11/484,358 titled "APPARATUS AND METHOD FOR PUMPING AND OPERATING OPTICAL PARAMETRIC OSCILLATORS USING DFB FIBER LASERS" by Angus J. Henderson is incorporated herein by reference. This application describes an optical parametric oscillator (OPO) that efficiently converts a near-infrared laser beam to tunable mid-infrared wavelength output. In some embodiments, the OPO includes an optical resonator containing a nonlinear crystal, such as periodically-poled lithium niobate. The OPO is pumped by a continuous-wave fiber-laser source having a low-power oscillator and a high-power amplifier, or using just a power oscillator. The fiber oscillator produces a single-frequency output defined by a distributed-feedback (DFB) structure of the fiber. The DFB-fiber-laser output is amplified to a pump level consistent with exceeding an oscillation threshold in the OPO in which only one of two generated waves ("signal" and "idler") is resonant within the optical cavity. This pump source provides the capability to tune the DFB fiber laser by straining the fiber (using an attached piezoelectric element or by other means) that allows the OPO to be continuously tuned over substantial ranges, enabling rapid, wide continuous tuning of the OPO output frequency or frequencies.

U.S. patent application Ser. No. 11/017,192 titled "INJECTION SEEDED, Q-SWITCHED FIBER RING LASER" by Peter Dragic is incorporated herein by reference. This application describes a narrow linewidth, injection seeded, Q-switched Er fiber ring oscillator, that provides over 600 microWatts of average output power at 500 Hz, with 1.2 microJoules per pulse, before the output appears to be significantly affected by stimulated Brillouin scattering. This laser configuration provides multiple advantages in LIDAR systems because it offers the possibility of broad and rapid tunability.

U.S. patent application Ser. No. 10/537,900 titled "OPTICAL PULSE LASERS" by Mark Kenneth Jablonski is incorporated herein by reference. This application describes pulsed lasers which employ carbon nanotubes, particularly layers of carbon nanotubes, as saturable absorbers, mode lockers or for Q-switching elements. Also described are methods and materials for mode-locking and Q-switching of lasers in which carbon nanotubes are employed as non-linear optical materials and/or saturable absorbers which facilitate mode-locking and/or Q-switching. The invention further provides mode locker and Q-switching elements or devices which comprise one or more layers containing carbon nanotubes which layer or layers function for mode locking and/or Q-switching.

U.S. Pat. No. 6,288,835 titled "OPTICAL AMPLIFIERS AND LIGHT SOURCE" by Lars Johan Albinsson Nilsson is incorporated herein by reference. This patent describes Single- or few-moded waveguiding cladding-pumped lasers, superfluorescent sources, and amplifiers, as well as lasers, including those for high-energy pulses, in which the interaction between the waveguided light and a gain medium is substantially reduced. This leads to decreased losses of guided desired light as well as to decreased losses through emission of undesired light, compared to devices of the prior art. Furthermore, cross-talk and inter-symbol interference in semiconductor amplifiers can be reduced. Also described are devices with a predetermined saturation power. As a preferred embodiment of the invention, we disclose a single (transverse) mode optical fiber laser or amplifier in which the active medium (providing gain or saturable absorption) is shaped as a ring, situated in a region of the fiber' cross-section where the intensity of the signal light is substantially reduced compared to its peak value. The fiber can be cladding-pumped.

What are needed are improved methods and apparatus for generating high-power pulses of IR and/or green light.

SUMMARY OF THE INVENTION

In some embodiments, the present invention provides an apparatus, method and associated fiber-laser architectures for high-power pulsed operation and for pumping of wavelength-conversion devices. The architectures of the present invention enable operation of the fiber laser in Q-switched, cavity-dumping, or hybrid Q-switched/cavity-dumping modes.

In all of these modes of operation, the laser is designed as a unidirectional ring cavity, which minimizes pulse-to-pulse amplitude/temporal instabilities and feedback effects.

In some embodiments of the Q-switched mode, the laser includes a large-core rare-earth-doped fiber featuring low core NA (numeric aperture; in some embodiments, the low core NA is explicitly configured and intended to minimize the fraction of spontaneous emission from the active species that is captured in the core), an electro-optic switch of high on/off extinction (10 dB or higher) that provides enough inter-pulse extinction to minimize circulation and amplification of spontaneous emission in the laser cavity (in one of our baseline embodiments, this modulator is a small-aperture rubidium titanyl phosphate (RTP) Pockels cell), an output coupler, and an intracavity band-pass filter to enforce lasing operation in narrow wavelength range.

In some embodiments of the cavity-dumped mode, the laser is configured in a similar manner, except that an output coupler is no longer necessary since the optical power can be extracted from the laser cavity by the electro-optic switch itself. The same laser can be configured to operate in both Q-switched and cavity-dumping modes as well as in hybrid modes (e.g., partial Q-switch, followed by cavity dumping). In some embodiments, the laser can be used as, or inject laser light into, a regenerative solid-state amplifier.

Some embodiments include a ring laser with a large-core rare-earth-doped fiber that is ring-connected with a free-space path having an electro-optic switch, output coupler, one-way (unidirectional) isolator and/or intracavity band-pass filter to enforce lasing operation in narrow wavelength range. In some cavity-dumped modes, the laser is configured in a similar manner, except that an output coupler is no longer necessary since the optical power can be extracted from the laser cavity by the electro-optic switch itself. The same laser can be configured to operate in Q-switched and/or cavity-dumping modes as well as in hybrid modes (e.g., partial Q-switch, followed by cavity dumping, or even CW). In some embodiments, the laser can be used as, or inject laser light into, a regenerative solid-state amplifier, used a Raman amplifier or be used as a Raman laser to access wavelengths in the near and mid infrared. The laser can be also used to generate visible, ultra-violet, mid-infrared, and far-infrared (THz) radiation via nonlinear wavelength conversion processes including frequency doubling, tripling and quadrupling; optical-parametric generation, optical-parametric amplification, and optical-parametric oscillation; difference-frequency mixing; sum-frequency mixing; and optical rectification. In all of these embodiments, the laser can be used as a stand-alone laser or as a seed laser for optical amplifiers.

In some embodiments, a laser of the present invention, in all of its modes of operation (Q-switched, cavity-dumped, or partial Q-switch followed by cavity dumping), can emit radiation in the 900-nm- to 1100-nm-wavelength range (in some embodiments, using a fiber doped with Yb or Nd or both), 1500-1650-nm range (in some embodiments, using a fiber doped with Er), or 1650-2100-nm range (in some embodiments, using a fiber doped with Tm, Ho, or both). The laser can also pump a Raman amplifier or be used as a Raman laser to access wavelengths in the near and mid-infrared wavelength ranges. The laser of the present invention can be also used to generate visible, ultra-violet, mid-infrared, and far-infrared (THz) radiation via nonlinear wavelength conversion processes including frequency doubling, tripling and quadrupling; optical-parametric generation, optical-parametric amplification, and optical-parametric oscillation; difference-frequency mixing; sum-frequency mixing; and optical rectification, just to name a few. In all of these embodiments, the laser can be used as a stand-alone laser or as a seed laser for optical amplifiers.

In some embodiments, the present invention provides high-power output pulses that can be used to cut, ablate, and/or cauterize soft tissue (such as may be needed for surgery on a human patient).

Other advantages of the present invention include low cost, relatively compact footprint, few parts, solid-state parts, and relatively simple setup and operation.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

In some embodiments, the present invention provides an apparatus and process wherein a fiber ring laser is operated in Q-switched, cavity-dumping, or hybrid Q-switched/cavity-dumping modes. In some embodiments, the fiber laser operates in the infrared wavelengths (having one or more wavelengths selectable via the one or more active dopant species that is/are used in the fabrication of the fiber, and via the band-pass filter(s) used), and outputs short-duration very-high-power pulses (e.g., thousands of kilowatts, in some embodiments). In some embodiments, the output of the fiber ring laser is converted to a desired wavelength in the visible, ultra-violet, mid-infrared, or far-infrared (THz) radiation via nonlinear wavelength conversion devices including frequency doubling, tripling and quadrupling elements, optical-parametric generation units, optical-parametric amplification units, and optical-parametric oscillation units, difference-frequency mixing units, sum-frequency mixing units, and optical rectification units, for example.

Figure 1A:
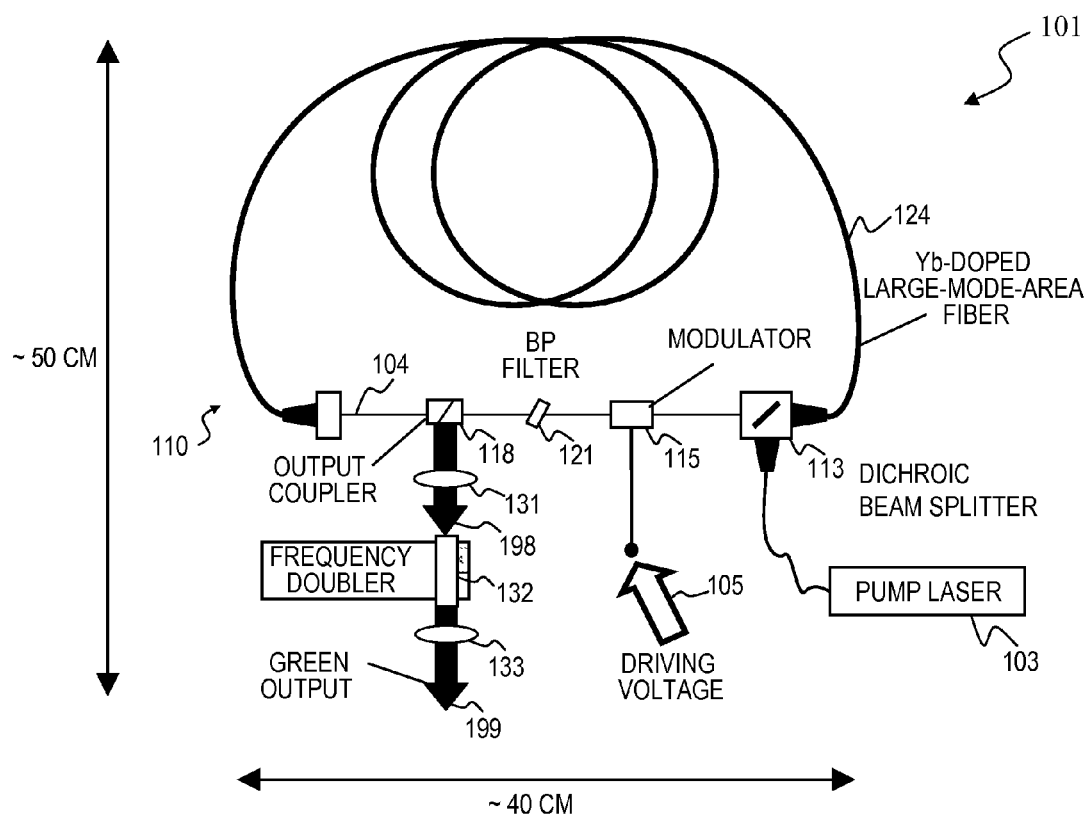
FIG. 1A is a block diagram of a visible-output system 101 using an IR ring laser 110.
Figure 4:
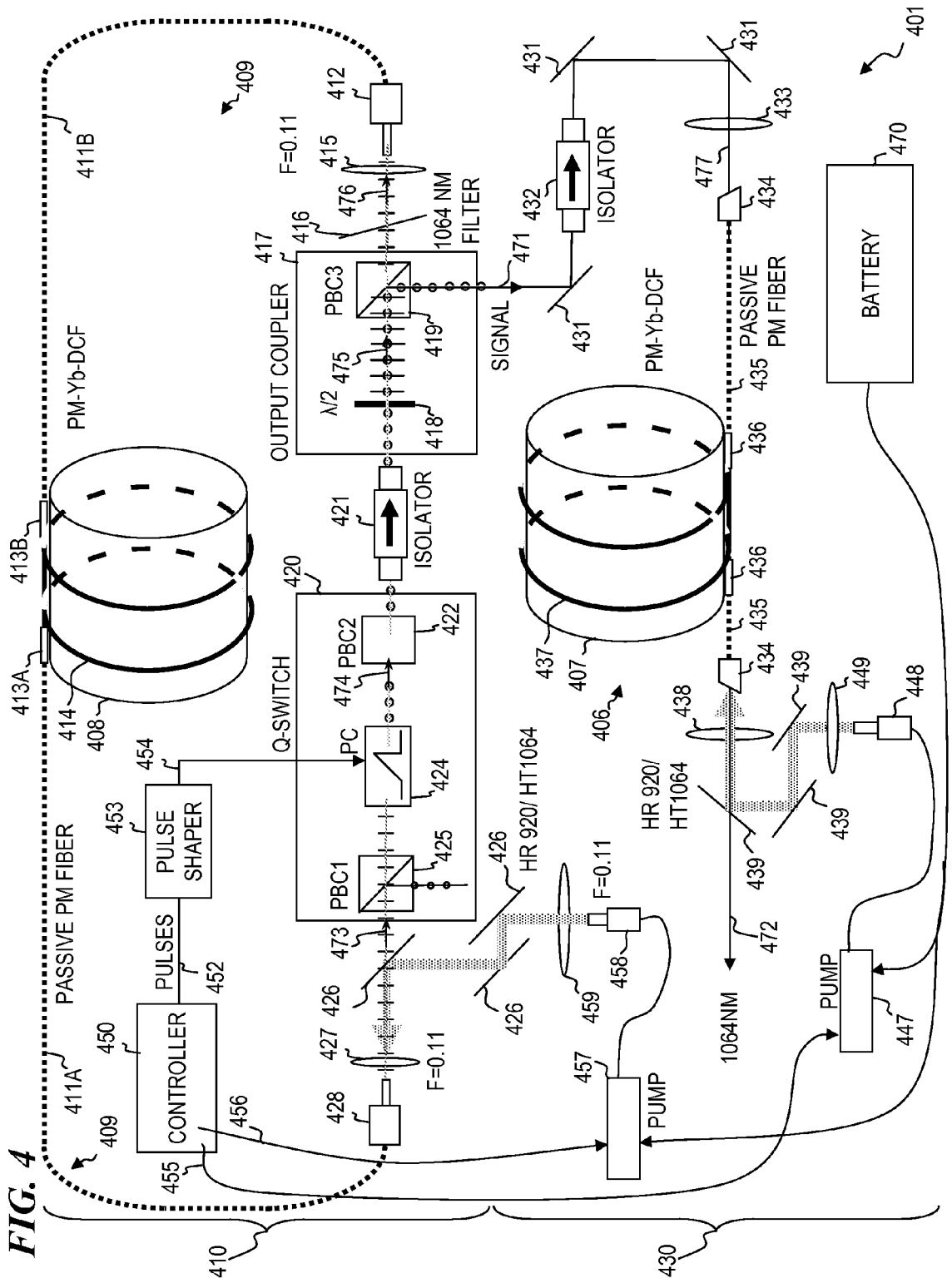
FIG. 4 is a block diagram of a high-power IR fiber ring laser 401.

FIG. 1A is a simplified block diagram of a visible-output system 101 using an IR ring laser 110. In some embodiments, system 101 includes a Q-switched IR-signal fiber ring laser 110 that includes a fiber 124 having couplers at its ends that are used to form a free-space in-cavity beam 104. This configuration is sometimes called a "power oscillator" since the laser output is taken directly from the ring rather than having additional amplification by a power amplifier outside the ring as in a MOPA configuration, for example as shown in FIG. 4. In some embodiments, ring laser 110 also includes a dichroic beam splitter 113, pump laser 103, Q-switch modulator 115 driven by a pulsed driving voltage 105, band-pass filter 121, and output beam splitter 118. In some embodiments, the wavelength spectrum of beam 104 is narrowed and determined by band-pass filter 121. In some embodiments, dichroic beam splitter 113 is used to launch pump light from pump laser 103 into the fiber 124. In some embodiments, the ring-laser output beam 198 is focused by lens 131 into wavelength-conversion device 132 (in some embodiments, a frequency doubler), and its output is collimated by lens 133 to form output beam 199. In some embodiments, system 101 fits into a footprint of about 50 cm by 40 cm or smaller.

Figure 1B:
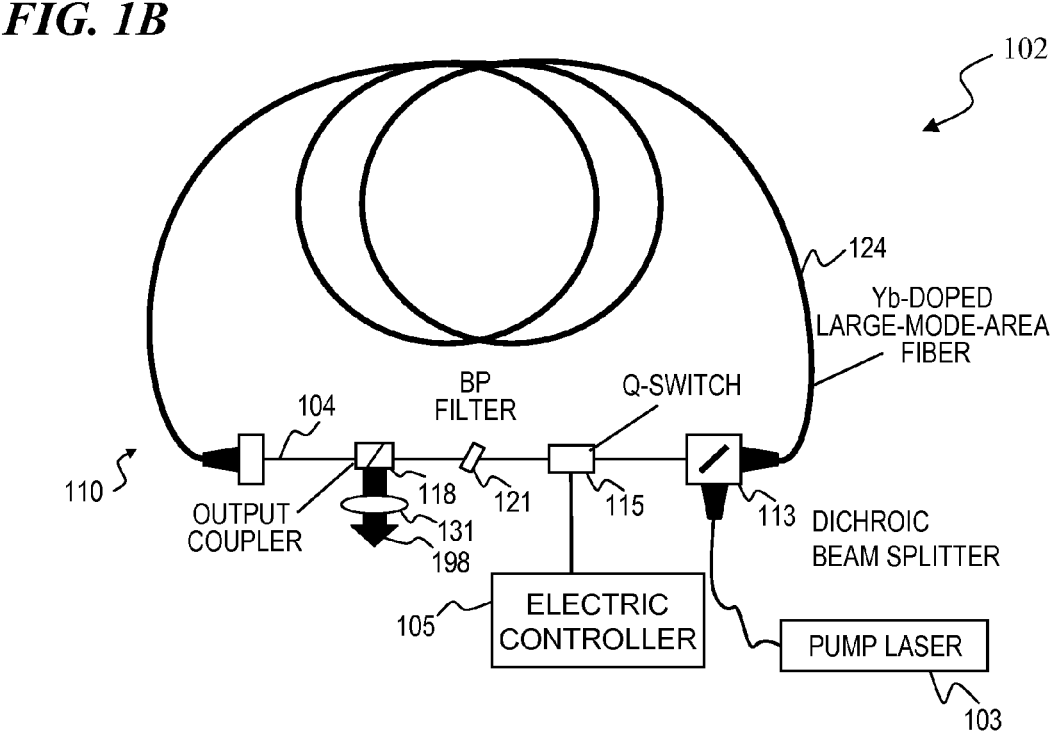
FIG. 1B is a block diagram of an IR-output system 102 using an IR ring laser 110.

FIG. 1B is a block diagram of an IR-output system 102 using an IR ring laser 110. In some embodiments, system 102 outputs a laser signal 198 that is used directly, while in other embodiments, signal 198 is passed through a wavelength converter (such as a frequency doubler or an optical parametric oscillator (OPO) or optical parametric amplifier (OPA) or other suitable non-linear wavelength-conversion device). In some embodiments, electric controller 105 generates a shaped electrical signal suitable to drive Q-switch 115 in a manner that generates a more-constant-amplitude pulse train. In the embodiment shown, pump laser 103 has its output coupled into gain fiber 124 using a free space wavelength dependent element such as a dichroic beam splitter that reflects pump light and passes signal light.

Figure 1C:
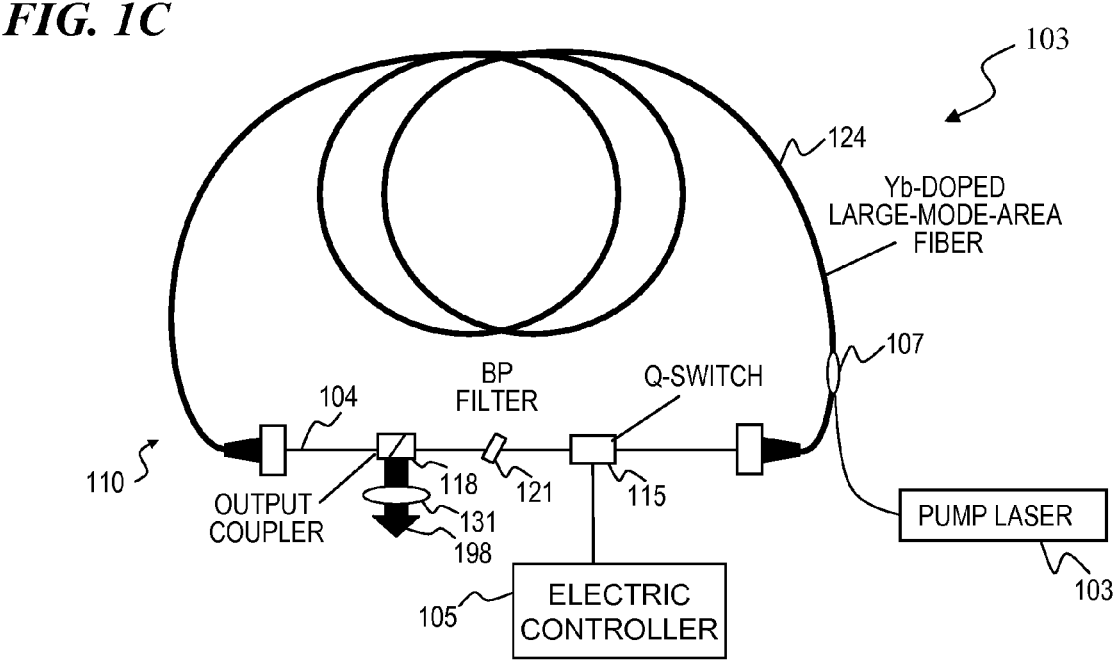
FIG. 1C is a block diagram of an IR-output system 103 using an IR ring laser 110.

FIG. 1C is a block diagram of an IR-output system 103 using an IR ring laser 110. System 103 is substantially similar to system 102 of FIG. 1B except that the pump power is side coupled into gain fiber 124 using a device such as a star coupler 107.

Figure 2A:
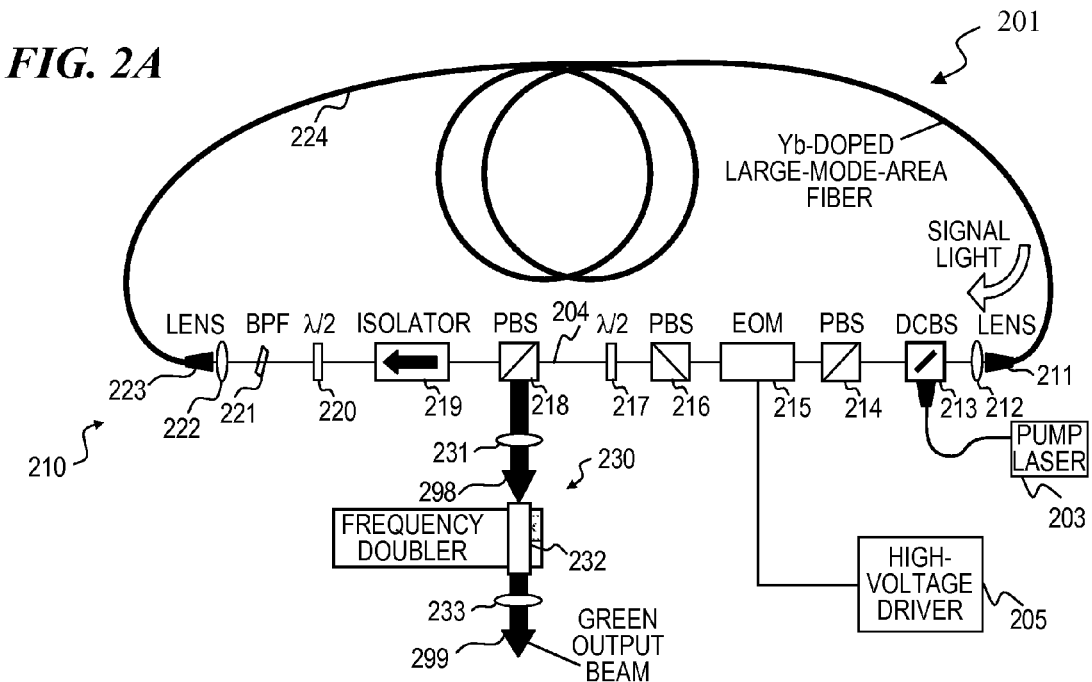
FIG. 2A is a block diagram of a visible-output system 201 using an IR ring laser 210.

FIG. 2A is a block diagram of a visible-output system 201 using an IR ring laser 210. In some embodiments, system 200 includes a Q-switched IR-signal fiber ring laser 210 that includes a fiber 224 having fiber-to-free-space couplers (formed by fused silica endcap 223 and lens 222 (at the left end in FIG. 2) and fused silica endcap 211 and lens 212 (at the right end in FIG. 2)) that are used to form a free-space in-cavity beam 204. In the embodiment shown, ring laser 210 operates in a power oscillator mode, wherein the oscillator and power amplifier functions of the laser are combined, and a high-power pulse 298 is output from the ring laser 210. In some embodiments, ring laser 210 also includes a pump laser 203 (e.g., a diode laser that outputs a continuous-wave (cw) signal during operation of the laser (e.g., in some embodiments, the output power of the pump laser is in the range of about 1 W to about 500 W or more, of a wavelength shorter than the ring-laser wavelength, e.g., about 976 nm, in some embodiments), a dichroic beam splitter 213 that passes the signal wavelength but reflects the pump light in a counter-propagating direction into the ring fiber 224 (in a counter-clockwise direction, in the embodiment shown), a first polarizing beam splitter 214, Q-switch modulator 215 driven by a pulsed driving voltage 205, a second polarizing beam splitter 216, first half-wave plate 217, a third polarizing beam splitter 218 used to output the infrared intermediate output beam 298 through lens 231, optical isolator 219 used to obtain unidirectional (in a clockwise direction, in the embodiment shown) signal in the ring laser, second half-wave plate 220, band-pass filter 221 (e.g., a Fabry-Perot interferometer having an angle-adjustable wavelength selectivity). In some embodiments, the wavelength spectrum of beam 204 is narrowed and determined by band-pass filter 221 (e.g., in some embodiments, a filter having a 0.7-nm-linewidth passband, such as a band-pass filter part number ACO-1064/5 Bandpass from Barr Associates, Inc., 2 Lyberty Way, Westford, Mass. 01886 USA, having a web address www.barrassociates.com). In some embodiments, the pump light from pump laser 203 counter-propagates relative to beam 204, and is launched or combined (in the counter-clockwise direction in the figure) into the ring beam 204 by dichroic beam splitter 213 (e.g., in some embodiments, a dichroic beam splitter mirror, such as part number R980/T1064BS1.0 from Barr Associates, Inc.). In some embodiments, the half-wave retardation plates 217 and 220 (e.g., in some embodiments, part number QWPO-1064010-2-R10 from CVI Laser, L.L.C., 200 Dorado SE, Albuquerque, N. Mex. 87123 USA, having a web address www.cvilaser.com) each provide a rotation in the direction of polarization of beam 204 by an amount greater than 45 degrees and less than 90 degrees, in some embodiments, with an angle set or optimized by measuring the output power with a power meter and maximizing the output power by adjusting the polarization angle. In some embodiments, beam splitters 214, 216, and 218 are polarizing beam-splitting (PBS) cubes (e.g., in some embodiments, part number PBS-1064-010 from CVI Laser, LLC). In some embodiments, PBS 214 (in other embodiments, this beam splitter 214 is a Glan-Thompson polarizer or a walk-off polarizer such as or similar to model PBD3070 available from Casix Corporation of Fuzhou, Fujian, China, rather than part number PBS-1064-010) cleans up the polarization of the signal light before it enters modulator 215 (e.g., an electro-optic RTP Q-switch), while the second PBS 216 is used with the modulator 215 to pass or block the signal beam 204. Half-wave plate 217 is set to an angle that rotates the direction of polarization such that most of the signal beam is output to intermediate beam 298, while passing a small portion to isolator 219 to seed further lasing. A second half-wave plate 220 is used to rotate the seed light polarization to match the polarization angle of the gain fiber 224 (which, in some embodiments, includes two "stress rods", one on either side of its 25-micron core in a 250-micron fiber, to promote and maintain polarized amplification in the fiber. In some embodiments, the band-pass filter 221 is a 0.7-nm-linewidth thin-film interferometer set at angle to select the desired wavelength (e.g., using a filter that at a normal angle passes 1080-nm light, but set at an angle of about ten degrees, in order to pass 1064 nm). Lens 222 focuses the seed light into the endcap 223 of fiber 224.

In some embodiments, the intermediate beam 298 is frequency doubled (and thus wavelength-halved) from a wavelength of 1064.4 nm (IR) to 532.2 nm (green) by a non-linear crystal such as lithium borate (LBO). In some embodiments, the green output beam is used for any suitable purpose, such as possible medical purposes. In some embodiments, intermediate beam 298 is 5000 Watts pulses (up to 10 Watts continuous) or more, and up to 50 percent or more of the intermediate beam 298 is converted to green light, resulting in green-light output of 2500 Watts peak (up to 5 Watts continuous) or more.

In some embodiments, isolator 219 (e.g., in some embodiments, Optical Isolator part number 211064 from Electro-Optics Technology, Inc., 5835 Shugart Lane, Traverse City, Mich. 49684 USA having a web address www.eotech.com) ensures unidirectional (clockwise direction in the figure) lasing in the ring laser 210. In some embodiments, the gain fiber 224 is ytterbium doped to lase at about 1064 nm (e.g., in some embodiments, about 2 meters of ytterbium-doped gain fiber part number Yb1200-25-250DC-PM from Liekki Corporation, Sorronrinne 9, FI-08500 Lohja, Finland, having a web address www.liekki.com). In some embodiments, the Q-switch modulator 215 is an RTP (rubidium titanyl phosphate) Pockels cell (e.g., in some embodiments, Q-Switch: RTP, 4×4×20 mm from Raicol Crystals Ltd., 15 Giron St., Industrial Zone, Yehud, 56217 Israel, with a web site at www.raicol.com (e.g., "Their Q-switch is built using two RTP elements in a temperature-compensating design. The unique properties of RTP, including high electrical resistivity (~1011-1012W·cm) and a high damage threshold, result in a Q-switch with outstanding properties. These Q-switches have been tested by Raicol at 100 khz, with no sign of piezoelectric ringing. Their advantages include: high damage threshold, no piezoelectric ringing, low insertion loss, thermal-compensating design, non-hygroscopic, high extinction and contrast ratio, and a spectral range 500-3000 nm. In some embodiments, their specifications include: transmission at 1064 nm: >98.5%, static half wave voltage at 1064 nm: for parts measuring 4×4×20 mm: 1,600 v, for parts measuring 6×6×20 mm: 2,400 v, and for parts measuring 9×9×20 mm: 3,600 v; contrast ratio: >20 db at 633 nm; aperture: from 2×2 $mm^2$ up to 15×15 $mm^2$; ar coating: r<0.1% at 1064 nm; damage threshold: >600 $mw/cm^2$ at 1064 nm; and 10 nsec pulse." In some embodiments, these are Biaxial crystals and natural Birefringence needs to be compensated by use of two crystal rods specially oriented so that the beam passes along the X-direction. The input beam is polarized along the diagonal of the input face and Z and Y axes are perpendicular to the two side faces. The Y and Z faces are rotated by 90 degrees in the second crystal for thermal compensation. The 'o' ray in the first crystal becomes the 'e' ray in the second crystal and vice versa, so that the thermal birefringence is compensated. Matched pairs (equal lengths polished together) are used for effective compensation. The effective E-O constant $r_{c1}$ (light propagating along the Y axis) is 23.6 pm/V and E-O constant $r_{c2}$ (light propagating along the X axis) is 20.3 pm/V. The contrast ratio is better for $r_{c2}$ constant. In some embodiments, at repetition rates of 50 KHz, the noise due to piezo-electric ringing is less than 3% while that in BBO it is 10% when operated at 30 KHz. However in RTP Pockels cells, the half-wave voltage is about 40% of that of BBO Pockels cell.)

In some embodiments, in unit 230, the ring-laser output beam 298 is focused by lens 231 into wavelength-conversion device 232 (in some embodiments, a frequency doubler that doubles the frequency, and thus halves the wavelength of the light from infrared at 1064 nm to green at 532 nm), and its output is collimated by lens 233 to form output beam 299. In some embodiments, a wavelength-selective dichroic mirror is used in the output beam 299 to pass the converted wavelengths and block any residual infrared wavelengths.

Figure 2B:
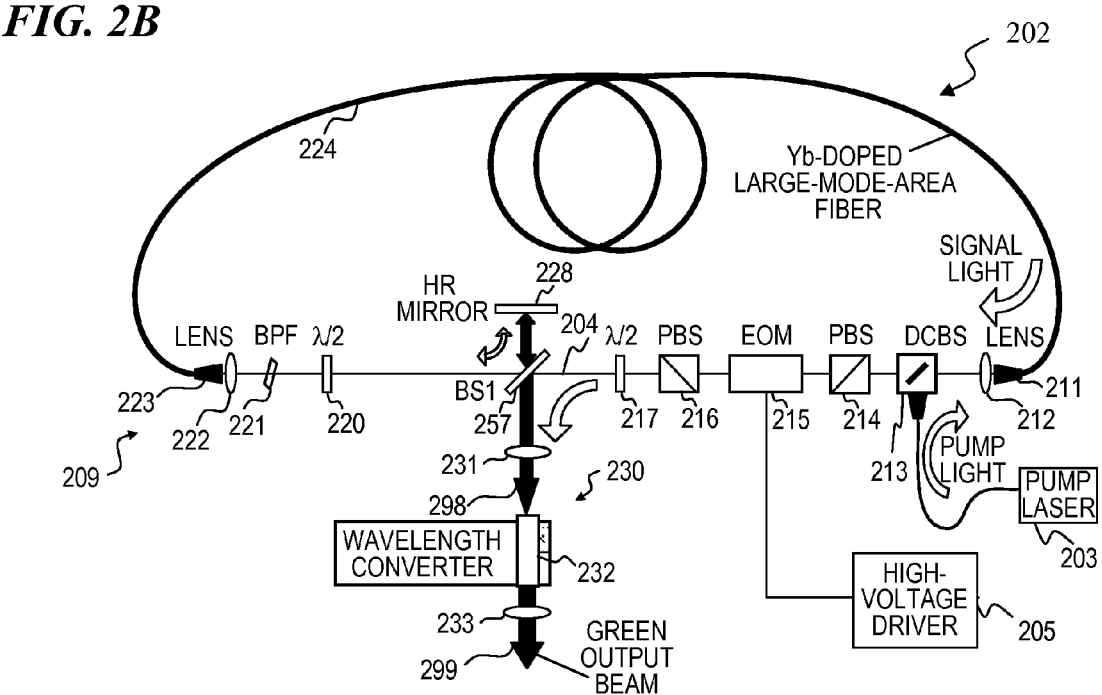
FIG. 2B is a block diagram of a one-or-more-wavelength-output system 202 using an IR ring laser 210.

FIG. 2B is a block diagram of a visible-output system 202 using an IR ring laser 209. In some embodiments, system 202 operates in a manner substantially similar to that described for system 201 of FIG. 2A, except that isolator 219 is omitted (in order to reduce power loss in the forward direction, since there will be some reduction in power of the laser signal wavelength even going in the forward clockwise direction if the signal (right-to-left in FIG. 2A) though the isolator 219), and the function of forcing the signal wavelength to go in the clockwise direction is instead provided by non-polarizing beam splitter 257 (in some embodiments, beam splitter 257 reflects about 70 percent and transmits about 30 percent of the impinging signal; in other embodiments, different percentages are used in order to optimize the output power and stability) and high-reflectivity mirror 228, which work together to reflect any laser light going in the counterclockwise direction back to the clockwise direction (or out though lens 231). Since much of the counterclockwise laser light will be reflected back to the clockwise direction, the primary amplification will go into the unidirectional clockwise-direction laser signal, which thus becomes the dominant mode of operation of the ring laser.

Figure 2C:
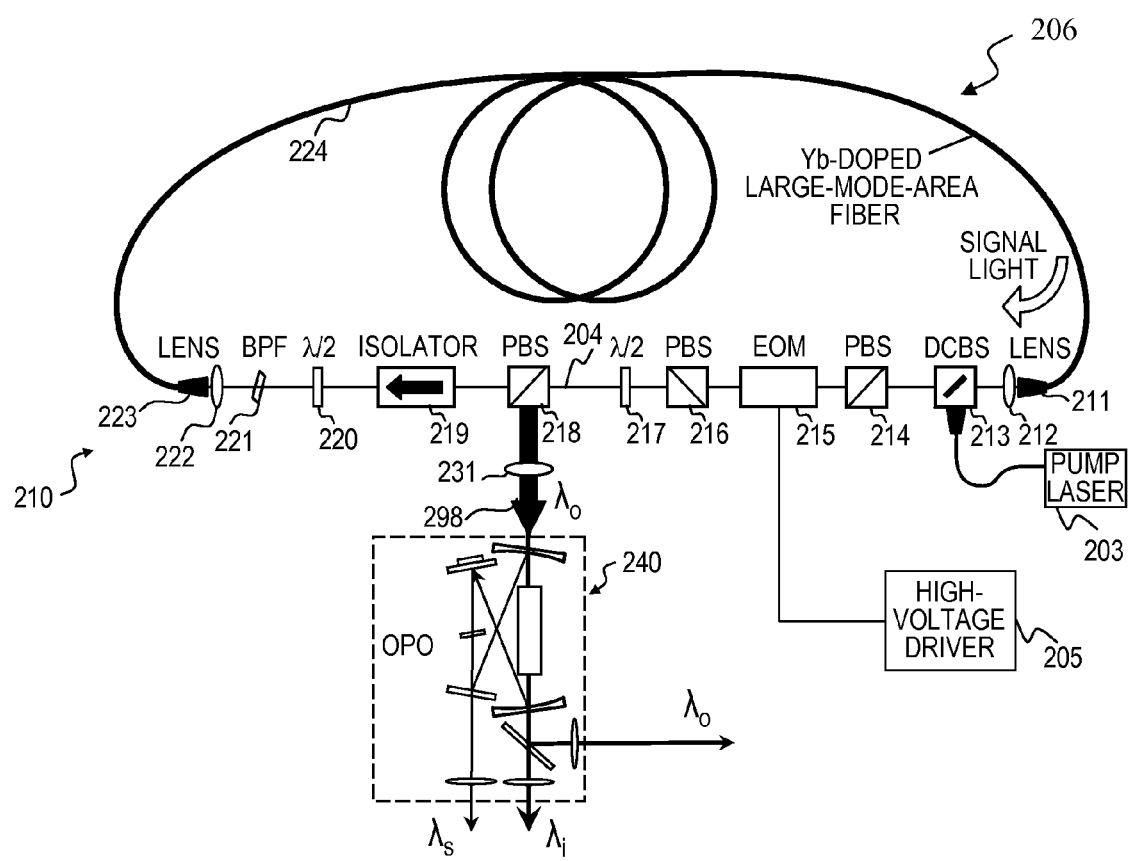
FIG. 2C is a block diagram of a one-or-more-wavelength-output system 206 using an IR ring laser 210.

FIG. 2C is a block diagram of a one-or-more-wavelength-output system 206 using an IR ring laser 210. In some embodiments, system 206 operates in a manner substantially similar to that described for system 201 of FIG. 2A, except that frequency double 232 is omitted, and replaced by OPO 240. In some embodiments, OPO 240 can output coherent light at each of up to three different wavelengths, viz., a pump wavelength $\lambda_o$ which is the unconverted portion of intermediate signal 298, an idler wavelength $\lambda_i$ that is one of the two wavelengths resonant in OPO 240, and a signal wavelength $\lambda_S$ that is the other of the two wavelengths resonant in OPO 240. A more detailed description of an OPO that can be used in system 206 is provided in U.S. patent application Ser. No. 11/484,358 titled "APPARATUS AND METHOD FOR PUMPING AND OPERATING OPTICAL PARAMETRIC OSCILLATORS USING DFB FIBER LASERS" filed Jul. 10, 2006 (which is incorporated herein by reference).

Figure 3A:
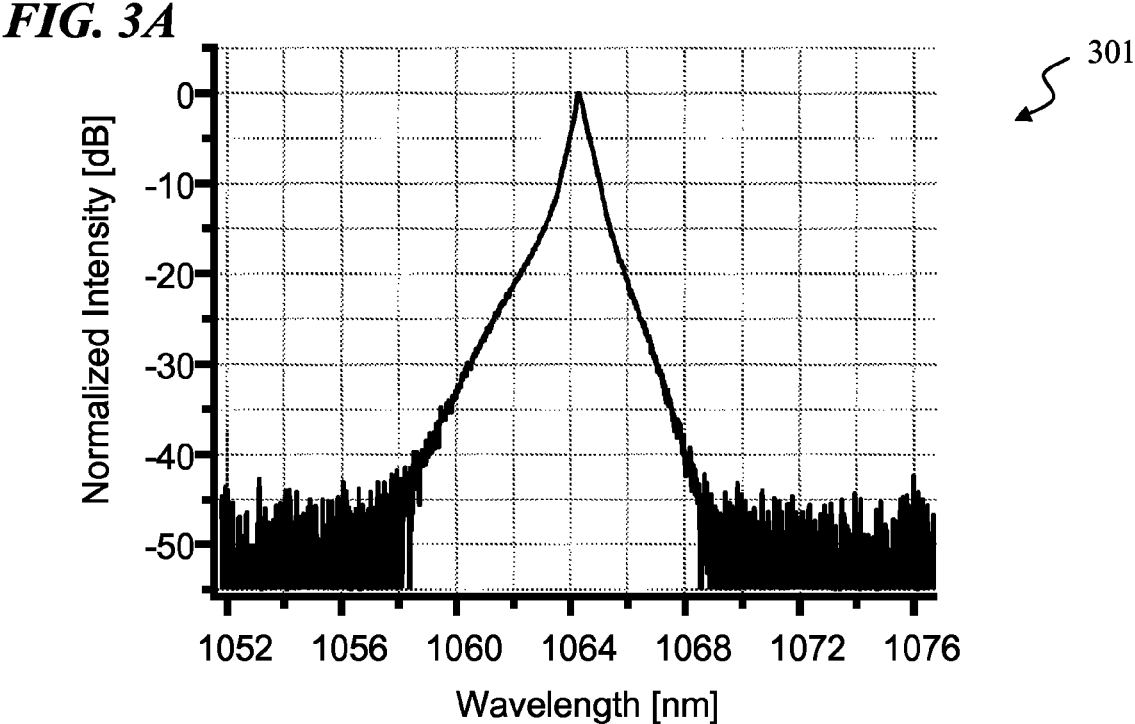
FIG. 3A is a log graph 301 of a spectrum of the infrared output of ring laser 210.

FIG. 3A is a log graph 301 of a spectrum of the infrared output of ring laser 210. This shows the output signal as having a peak at about 1064.4 nm and a reduction of more than 40 dB at wavelengths shorter than about 1058 nm or longer than about 1069 nm.

Figure 3B:
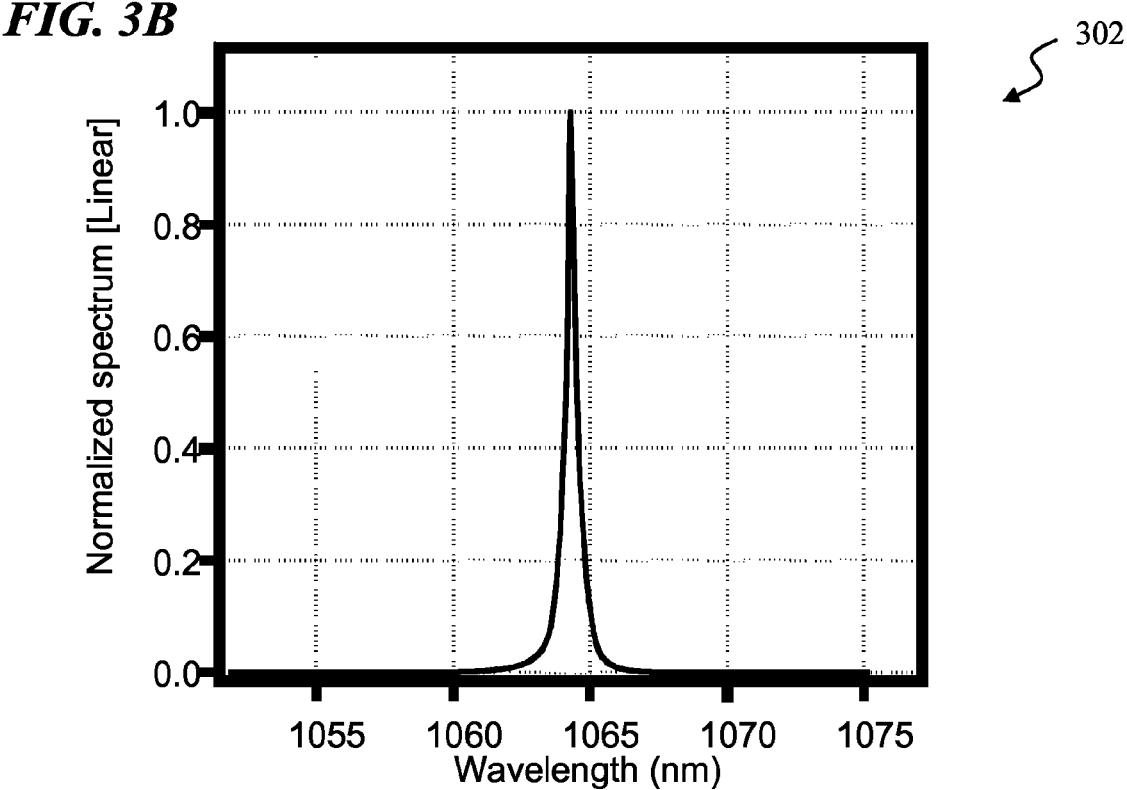
FIG. 3B is a linear graph 402 of a spectrum of the infrared output of ring laser 210.

FIG. 3B is a linear graph 302 of a spectrum of the infrared output of ring laser 210. This represents the same signal as shown in FIG. 3, but on a linear scale, and shows the output signal as having a peak at about 1064.4 nm and full-width half-maximum (FWHM) line width of less than 1 nm.

In some embodiments of the present invention, the gain fiber(s) used in the master oscillator and/or power amplifier stages of each of the described ring lasers are doped with Yb (in some embodiments, the lasing signal wavelength is about 1064 nm, while in other embodiments, the lasing signal wavelength is in the range of about 1040 nm to about 1100 nm, and in some embodiments, the pump light has a wavelength in the range of about 915 nm to 977 nm).

In some embodiments of the present invention, the gain fiber(s) used in the master oscillator and/or power amplifier stages of each of the described ring lasers are doped with Er (in some embodiments, the lasing signal wavelength in Erbium's L-Band at about 1600 nm, while in other embodiments, the lasing signal wavelength is in the range of about 1515 nm to about 1630 nm and pump wavelength of 980 nm or 1480 nm, such as described in co-owned U.S. patent application Ser. No. 12/018,193, which is incorporated herein by reference).

In some embodiments of the present invention, the gain fiber(s) used in the master oscillator and/or power amplifier stages of each of the described ring lasers are co-doped with Er and Yb (in some embodiments, the lasing signal wavelength is about 1550 nm, while in other embodiments, the lasing signal wavelength is in the range of about 1515 nm to about 1630, and in some embodiments, a pump wavelength is in the range of 915-977 nm).

In some embodiments of the present invention, the gain fiber(s) used in the master oscillator and/or power amplifier stages of each of the described ring lasers are doped with Tm (in some embodiments, the lasing signal wavelength is about 1940 nm, while in other embodiments, the lasing signal wavelength is in the range of about 1880 nm and about 2040 nm, and, in some embodiments, a pump wavelength of about 794 nm is used, such as described in co-owned U.S. patent application Ser. No. 12/050,937, which is incorporated herein by reference).

In some embodiments of the present invention, the gain fiber(s) used in the master oscillator and/or power amplifier stages of each of the described ring lasers are doped with Nd (in some embodiments, the lasing signal wavelength is about 940 nm, and the laser is pumped using a wavelength of 800-810 nm).

In some embodiments, the wavelength filter of the ring lasers (e.g., filter 416 in FIG. 4, filter 621 in FIGS. 6A and 6B, filter 821 in FIGS. 8A and 9B, filter 921 in FIG. 9, and filter 1021 in FIGS. 10A and 10B) can be adjusted by, e.g., tilting the filter element to achieve the desired wavelength of the ring laser.

FIG. 4 is a schematic block diagram of a multiple-mode laser system (MMLS) 401 according to some embodiments of the invention. In some embodiments, a master-oscillator power-amplifier (MOPA) configuration is used such as shown in FIG. 4, wherein MMLS 401 includes a master-oscillator portion 410 and a power-amplifier portion 430. In some embodiments, a wavelength conversion device (not shown here, but in a manner similar to those shown in other figures herein) is coupled to receive the output signal 472. In some embodiments, a ring-oscillator configuration (a ring laser that generates a seed signal 471 later amplified by the power amplifier 430) is used for master-oscillator portion 410, wherein pump light is launched in a counter-propagating direction (e.g., clockwise direction in FIG. 4) through a lens 427 into a fiber endcap and/or ferrule 428.

In some embodiments, a fiber portion 409 includes endcap 428, passive polarization-maintaining (PM) fiber 411A, splice 413A, PM gain fiber 414, another splice 413B, another passive PM fiber 411B, and another endcap 412. In some embodiments, gain fiber 414 is a polarization-maintaining ytterbium-doped (Yb-doped) double-clad (PM-Yb-DCF) fiber having a large mode area (LMA). In some embodiments, gain fiber 414 is a photonic crystal fiber (PCF). In some embodiments, gain fiber 414 is a polarization-maintaining photonic crystal fiber (PZ-PCF).

In some embodiments of each of the other ring lasers in the figures (e.g., those shown in FIGS. 1A, 1B, 1C, 2A, 2B, 2C, 4, 6A, 6B, 7, 8A, 8B, 9, 10A, 10B, 11A, and 11B) described herein, the respective gain fibers for the master oscillators, power oscillators, and/or power amplifiers include passive PM end fibers spliced to one or both ends of the gain fibers, in order to reduce heat in portions of the fiber that are not in good thermal contact with a heat sink (such as a water-cooled mandrel 408).

For example, some embodiments use a rare-earth-doped fiber (e.g., in some embodiments, the length of gain fiber 414 is in the range of 1-5 meters long) having a core diameter of about 10 microns to about 25 microns or larger and an outer diameter of between about 250 microns and about 400 microns (e.g., fibers such as these are available or can be ordered from companies such as Nufern, 7 Airport Park Road, East Granby, Conn. 06026, Coractive, 2700 Jean-Perrin, Suite 121, Quebec (Qc), Canada, G2C 1S9, or OFS, 2000 Northeast Expressway, Norcross, Ga., 30071). In some embodiments, the first section 411A of the fiber portion 409 of the ring master oscillator 410 is a passive (e.g., a substantially non-doped fiber) polarization-maintaining (PM) fiber (rather than an active gain fiber) in order to minimize the heating of this portion of the fiber from the pump and signal light. In some embodiments, the length of passive fiber is calculated or empirically determined and adjusted to be of a length suitable for stable lasing at the desired signal wavelength. In some embodiments, a section of gain fiber 414 is spliced to the passive PM fiber 411A and 411B at splices 413A and 413B, in order that the gain fiber 414 can be more fully wrapped around a cooling mandrel 408 (in some embodiments, mandrel 408 is actively cooled, for example by pumping water through tubing attached to heat conducting metal of the mandrel 408 while in other embodiments, mandrel 408 provides a passively cooled heat sink function) to counteract the heating effects of the pump and signal light. This configuration of passive-active-passive fiber allows substantially all the gain fiber to be in intimate contact with the cooling mandrel 408. The right-hand splice 413B connects the PM gain fiber 414 to a second passive PM fiber 411B in the upper-right portion of FIG. 4, which is then connected into a fiber endcap and/or ferrule 412, such that feedback signal light 476 "left over" from output coupler 417 is wavelength-bandpass filtered through filter 416 (in some embodiments, this filter is tuned to transmit light having a wavelength of 1064 nm, one of the wavelengths facilitated by the Yb-doping in the gain fiber 414), focused by lens 415, and launched (relative to the orientation in FIG. 4) into the right-hand endcap 412 of fiber 411B in a counter-clockwise (CCW) direction into the fiber portion 409. In some embodiments, the numeric aperture (NA) of fiber section 409 is in the range of approximately 0.08 to 0.12 (e.g., F=0.11 in some embodiments).

In some embodiments, signal light traveling in the counter-clockwise direction in master-oscillator fiber 409 exits the left-end of passive fiber 409 through fiber endcap and/or ferrule 428 and is collimated by collimating lens 427, passes through dichroic mirror 426 (in some embodiments, each of these dichroic mirrors 426 (and each of the dichroic mirrors 439 of the power amplifier stage 430) are highly reflective to light having a wavelength of 920 nm (or whichever wavelength is used for the pump light) and highly transmissive to light having a wavelength of approximately 1064 nm (or whichever wavelength is used for the signal light) and enters Q-switch 420 (from left-to-right in FIG. 4). In some embodiments, Q-switch 420 is controlled by controller 450 and OR gate 453 that send electrical signal 454 to Pockels cell 424 to cause Pockels cell 424 to modulate (adjust) the polarization of the signal light in order to control the output of the signal light from the right end of Q-switch 420.

In some embodiments, controller 450 and pulse shaper 453 provide the means for selecting various operation modes of the MMLS 401 (e.g., in some embodiments, the pulse shaper generates a pulse having a rising slope that compensates for the falling gain in the laser as the stored pump energy is depleted. In some embodiments, the pulse shaper's output signal also compensates for the change in gain of the power amplifier 430 over time, in order to generate an output pulse that has an amplitude that is more constant over the length of the pulse.) In some embodiments, the length of the output pulse is adjustable by varying the pump power on the master oscillator 410. By providing pump power from pump 457 at a level just above the threshold for generating Q-switched laser pulses, the output pulse will be at the shorter end of the range of durations; while providing pump power from pump 457 at the maximum level possible for generating Q-switched laser pulses, the output pulse will be at the longer end of the range of possible durations. That is, the duration of the pulse can be varied by a factor of two to three by varying the pump light power from pump 457. Alternatively, or additionally, the length of the pulse can be varied by adjusting the power provided by power amplifier pump 457, and in some embodiments, this can provide another two to three times pulse duration variation. By adjusting the shape of the pulse 454 and by varying the pump power in the master oscillator 410 and or varying the pump power in the power amplifier 430, one can achieve a pulse duration adjustability of approximately ten to one.

As described in co-owned U.S. patent application Ser. No. 12/050,937 titled "A METHOD AND MULTIPLE-MODE DEVICE FOR HIGH-POWER SHORT-PULSE-LASER ABLATION AND CW CAUTERIZATION OF BODILY TISSUES" that was filed Mar. 18, 2008 (which is incorporated herein by reference), some embodiments can also provide a continuous wave (CW) mode or quasi-CW mode by outputting a CW-activation signal on line 451 in order to enable CW operation of the master oscillator without Q-switching. The alternative short-pulsed mode is achieved by outputting a series of short pulses to line 454, to control the Pockels cell 424. In some embodiments, the mode of MOPA 401 is also controlled by control signal 456 between controller 450 and master-oscillator pump laser 457 and/or control signal 455 between controller 450 and power-amplifier pump laser 447. For example, when in pulsed mode there is no need to pump master-oscillator 410 or power-amplifier 430 for a longer precharge than the typical pulse-to-pulse spacing between pulses for the mode desired (i.e., if operating at a 10,000 Hz pulse repetition rate (PRR) the pulse-to-pulse spacing is 100 microseconds; thus the master oscillator pump 457 and the power amplifier pump 447 would not be activated until 100 microseconds before the first pulse that is desired—that is a time indistinguishable from "instant on" relative to the activation by the user pressing the button to activate this short pulse mode. In fact, if a larger pre-charge time were allowed when the pump lasers are on but lasing is not allowed than the first lasing pulse would have an inordinately large power and energy content due to the longer time period to accumulate pump energy. Further, pumping into the gain fiber 414 when no output is desired causes unnecessary heating of the gain fiber 414 and the mandrel 408 (also for gain fiber 437 and mandrel 407 of the power amplifier).

In some embodiments, when the Pockels cell 424 is not activated (i.e., when the Q-switch 420 is turned OFF in order to prevent lasing) by the electrical signal 454 (i.e., when the Pockels cell 424 does not rotate the polarization of signal light 473), the signal light 474 (which was polarized to a plane in the plane of the sheet of the FIG. 4 drawing paper by polarizing beam cube (PBC1) 425, as indicated by the vertical cross markings on the signal light 473 between endcap 428 and Pockels cell 424) will be substantially blocked by polarizing beam cube (PBC2) 422 such that substantially no signal light is output through the right end of Q-switch 420 and the master-oscillator laser ring 410 will not lase when the Q-switch is in this OFF state. On the other hand, when the Pockels cell 424 is activated (i.e., when the Q-switch 420 is turned ON in order to facilitate lasing) by the electrical signal 454 (i.e., when the Pockels cell 424 rotates the polarization of signal light 473 by substantially 90 degrees such that signal light 474, as indicated by small circles indicating polarization perpendicular to the drawing sheet of FIG. 4), the signal light 474 (which was polarized to a plane in the plane of the sheet of the FIG. 4 drawing paper by polarizing beam cube (PBC1) 425, as indicated by the vertical cross markings on the signal light 473 between PBC1 425 and Pockels cell 424 and the polarization perpendicular to the drawing sheet as indicated by the small circles) will be substantially passed by polarizing beam cube (PBC2) 422 such that substantially all of the signal light is output through the right end of Q-switch 420 and the master-oscillator laser ring 410 will lase when the Q-switch is in this ON state.

In some embodiments, when the master oscillator ring laser is lasing, electrical signal 454 (in some embodiments, this signal is on the order of 400 volts or more when active; when pulse shaping is used, this signal will ramp up to the 400-volt voltage necessary to fully pass light) activates Pockels cell 424 to rotate the polarization of the signal light by substantially 90 degrees (as indicated by the circles on the signal light between Pockels cell (PC) 424. The λ/2 waveplate 418 is used to rotate the polarization of signal light 474 by a variable amount to generate signal light 475 having a polarization direction partially in the plane of the drawing sheet and partially in the direction perpendicular of the drawing sheet as indicated by both small-circles and vertical crossmarks on signal light 475, in order that an adjustable proportion of the signal light 475 will pass through polarizing beam cube 422 to become feedback signal 476 for the lasing operation, and the remaining signal light 471 exits the output coupler 417 as the output of master-oscillator laser ring 410 when lasing.

In some embodiments, isolator 421 allows signal light 474 to pass only in the left-to-right direction (CCW in the ring). This applies only to the signal light, since the pump light which is injected in the clockwise direction at endcap 428 is substantially absorbed by gain fiber 414 and blocked by the 1064-nm bandpass filter 416. Thus, signal light 471 that exits the Q-switch 420 passes through isolator 421 (used for obtaining unidirectional signal light propagation in the ring of master-oscillator 410) and enters output coupler 417 where the signal light passes through waveplate 418 (used for rotating the signal light polarization by an amount such that, in some embodiments, approximately about 30 percent of the signal light will be transmitted through polarizing beam cube 419 to form a feedback signal 476 for the ring laser and about 70 percent of the signal light will be reflected to form an intermediate output signal beam 471.

In some embodiments, intermediate output signal 471 is reflected by zero or more reflectors 431 and passed through optional isolator 432 (used to prevent spurious backward traveling signal from the power amplifier from disrupting operation of the master oscillator 410. The signal light is then focused by lens 433 into endcap 434 of power amplifier fiber 406. As was the case for the master oscillator fiber 409, in some embodiments, power amplifier fiber 406 includes a pair of passive PM fibers 435, one spliced to each end of active gain fiber 437 by splices 436. In some embodiments, gain fiber 437 is wound on a cooling mandrel 407. In some embodiments, the signal output from power amplifier 406 is coupled out of the left endcap 434 and collimated by lens 438 to form an output beam 472 after passing through one of the dichroic mirrors 439. In some embodiments, power amplifier pump laser 447 (in some embodiments, this is a semiconductor laser bar (e.g., up to 50 Watts or more in some embodiments) that generates pump light having a wavelength of approximately 920 nm, which is effectively absorbed by gain fiber 437 in order to amplify signal light 477 to form output signal beam 472. Also note that in some embodiments master oscillator pump 457 is a semiconductor laser bar that generates pump light (e.g., up to 25 Watts or more in some embodiments) also having a wavelength of approximately 920 nm, which is effectively absorbed by gain fiber 414 in order to amplify feedback signal light 476 to form the intermediate output signal beam 471.

In some embodiments, pump light from pump 457 is delivered through endcap 458 and collimated by lens 459 and then reflected by one or more dichroic mirrors 426 and then through focusing lens 427 into endcap 428 in a counter-propagating direction relative to the lasing signal light 473 in gain fiber 414. In some embodiments, pump light from pump 447 is delivered through endcap 448 and collimated by lens 449 and then reflected by one or more dichroic mirrors 439 and then through focusing lens 438 into endcap 434 in a counter-propagating direction relative to the signal light in gain fiber 437.

In some embodiments, a portable power supply 470 (e.g., in some embodiments, power supply 470 includes a rechargeable battery) is used to supply electrical power to pump lasers 447 and 457 under the control of controller 450.

Figure 5:
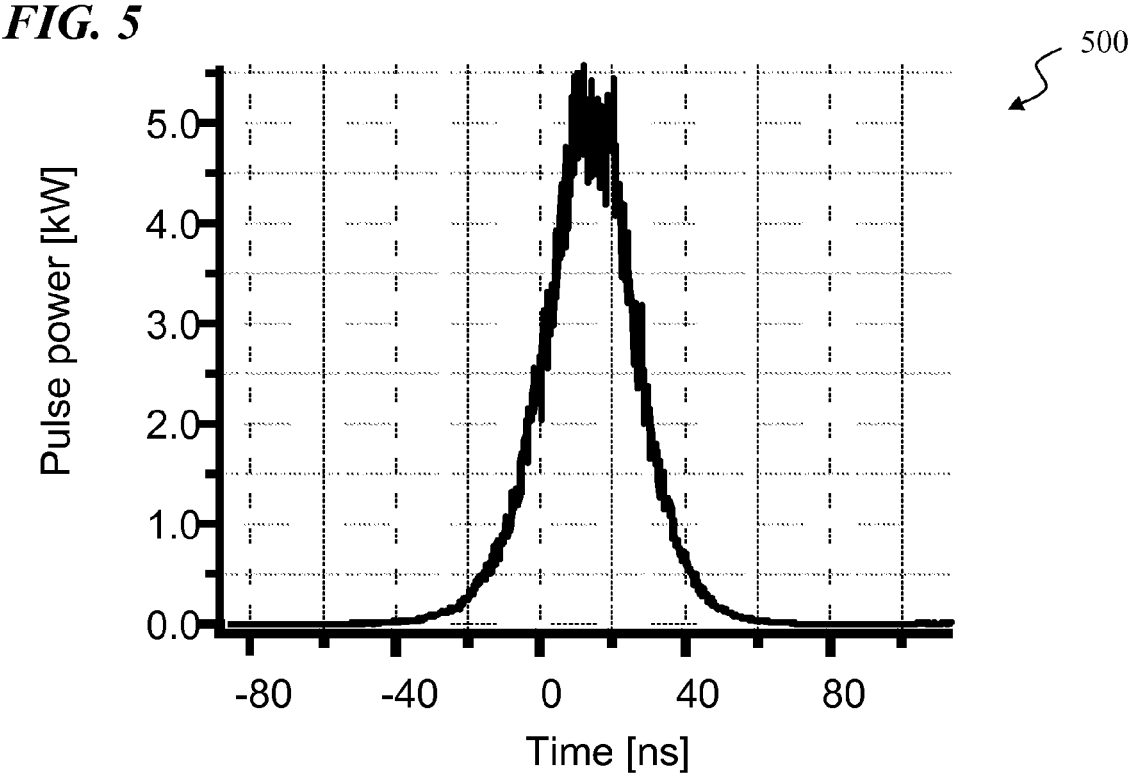
FIG. 5 is a linear graph 500 of a pulse width of the infrared output of ring laser 210.

FIG. 5 is a linear graph 500 of a pulse width of the infrared output of ring laser 210. The pulse has a FWHM duration of about 28 nanoseconds (nsec), and a peak intensity of more than about 5 kiloWatts (kW).

Figure 6A:
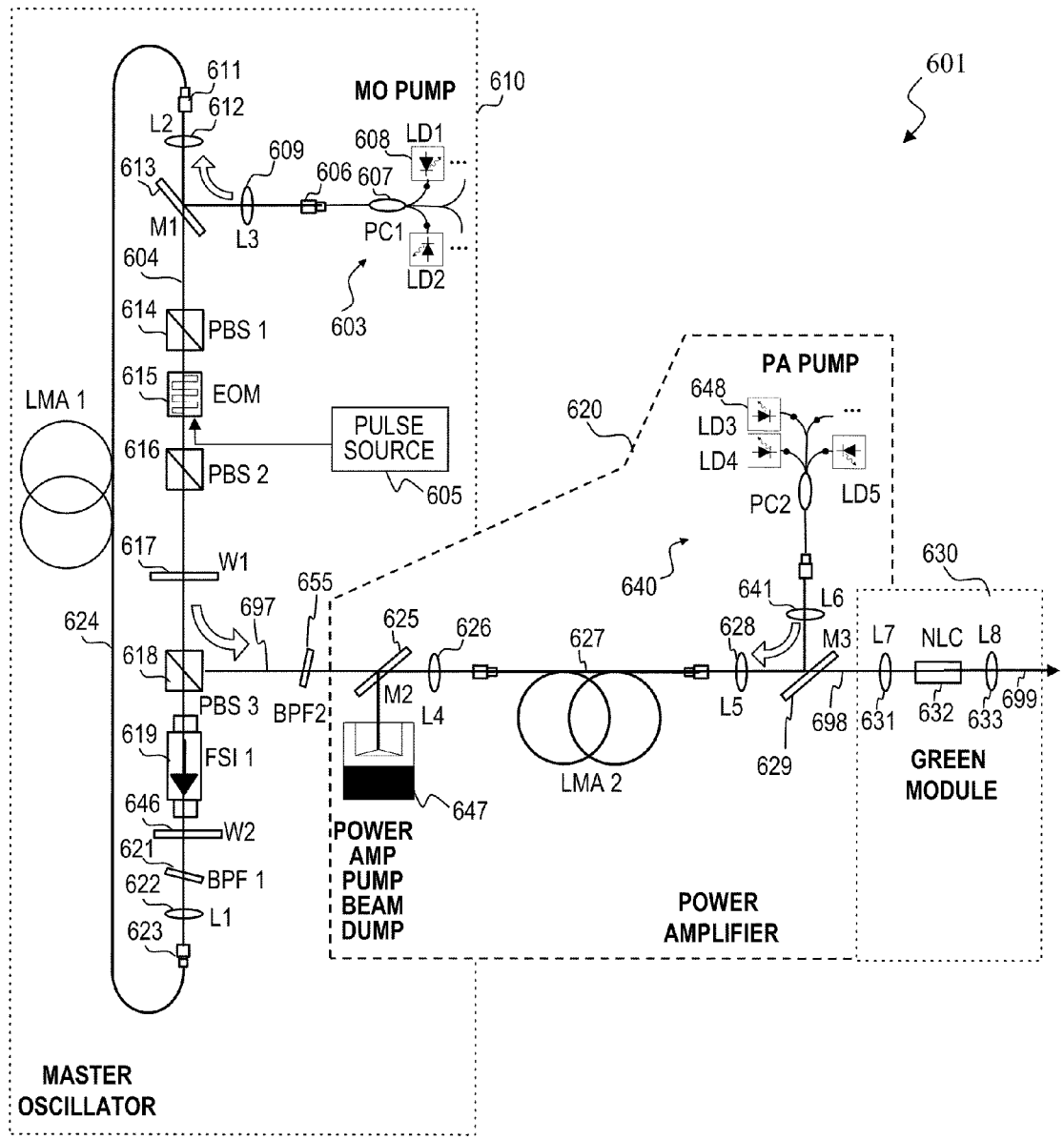
FIG. 6A is a block diagram of a visible-output system 601 using an IR ring laser 610.

FIG. 6A is a block diagram of a visible-output system 600 using an IR ring laser 610. In contrast to the power-oscillator operation of system 201 of FIG. 2A, the ring lasers of FIG. 6, FIG. 7, and FIG. 8 operate in a master-oscillator power-amplifier (MOPA) mode. In some embodiments, system 600 includes a Q-switched IR-signal fiber ring laser 610 that includes a rare-earth-doped (e.g., in some embodiments, ytterbium-doped) optical fiber 624 having fiber-to-free-space couplers (formed by fused silica endcap 623 and lens 622 (at the lower end in FIG. 6) and fused silica endcap 611 and lens 612 (at the upper end in FIG. 6)) that are used to form a free-space in-cavity beam 604. In the embodiment shown, ring laser 610 operates in a low-power master-oscillator mode, wherein the oscillator and power amplifier functions of the laser are separated, and power amplifier 620, external to the oscillator ring, generates the high-power pulse 698 from the output of the lower power ring laser 610.

In some embodiments, ring laser 610 also includes a pump laser 603 (e.g., a moderately low-power diode laser that outputs a continuous-wave (cw) signal during operation of the laser), a dichroic beam splitter 613 that passes the signal wavelength (traveling in a clockwise direction) but reflects the pump light in a counter-propagating counter-clockwise direction into the ring fiber 624, a first polarizing beam splitter 614, Q-switch modulator 615 driven by a pulsed driving voltage from pulse source 605, a second polarizing beam splitter 616, optical isolator 619 used to obtain unidirectional (in a clockwise direction, in the embodiment shown) signal in the ring laser, first half-wave plate 617, a third polarizing beam splitter 618 used to output the infrared intermediate output beam 697 through dichroic beamsplitter 625 (also called mirror M2, which, in some embodiments, is replaced by an optical isolator that prevents any high-power signal or pump light from traveling in a backward direction from the power amplifier stage 620 into the master oscillator 610), wherein the signal 697 is amplified by power amplifier 620 to form high-power output signal pulses 698 that exit through lens 631. In some embodiments, low-power infrared intermediate output beam 697 passes through a second band-pass filter 655 before entering the power amplifier 620. In some embodiments the wavelength spectrum of low-power infrared intermediate output beam 697 is narrowed and determined by band-pass filter 655 (e.g., in some embodiments, a filter having a 1.0-1.5-nm-linewidth passband; in other embodiments, the filter has a less-than-1-nm pass-band). In the master oscillator ring 610, the clockwise-traveling signal light continues from PBS 618 through band-pass filter 621 (e.g., a Fabry-Perot interferometer having an angle-adjustable wavelength selectivity). In some embodiments, the wavelength spectrum of beam 604 is narrowed and determined by band-pass filter 621 (e.g., in some embodiments, a filter having a 0.7-nm-linewidth passband, such as a band-pass filter part number ACO-1064/5 Bandpass from Barr Associates, Inc., 2 Lyberty Way, Westford, Mass. 01886 USA, having a web address www.barrassociates.com). In some embodiments, the pump light from pump laser 603 counter-propagates relative to beam 604, and is launched or combined (in the counter-clockwise direction in the figure) into the ring beam 604 by dichroic beam splitter 613 (e.g., in some embodiments, a dichroic beam splitter mirror, such as part number R980/T1064BS1.0 from Barr Associates, Inc.).

In some embodiments, the half-wave retardation plates 617 and 646 (e.g., in some embodiments, part number QWPO-1064010-2-R10 from CVI Laser, L.L.C., 200 Dorado SE, Albuquerque, N. Mex. 87123 USA, having a web address www.cvilaser.com) each provide a rotation in the direction of polarization of beam 604 by an amount greater than 45 degrees and less than 90 degrees, in some embodiments, with an angle set or optimized by measuring the output power with a power meter and maximizing the output power by adjusting the polarization angle. In some embodiments, beam splitters 614, 616, and 618 are polarizing beam-splitting (PBS) cubes (e.g., in some embodiments, part number PBS-1064-010 from CVI Laser, LLC). In some embodiments, PBS 614 (in other embodiments, this beam splitter 614 is a Glan-Thompson polarizer (walk-off) rather than part number PBS-1064-010) cleans up the polarization of the signal light before it enters modulator 615 (e.g., an electro-optic RTP Q-switch), while the second PBS 216 is used with the modulator 615 to pass or block the signal beam 604. Half-wave plate 617 is set to an angle that rotates the direction of polarization such that most of the signal beam is output to low-power infrared intermediate beam 697, while passing a small portion through narrow linewidth band-pass filter 621 to seed further lasing. In some embodiments, a second half-wave plate 646 is used to rotate the seed light polarization to match the polarization angle of the gain fiber 624. In some embodiments, gain fiber 624 is a polarizing/polarization-maintaining amplifying fiber, e.g., in some embodiments, one that includes two "stress rods", one on either side of its 25-micron core in a 250-micron-diameter fiber, to promote and maintain polarized amplification in the fiber. In some embodiments, the band-pass filter 621 is a 0.7-nm-linewidth thin-film interferometer set at angle to select the desired wavelength (e.g., a filter that at a normal angle passes 1080-nm light, but set at an angle of about ten degrees, in order to pass 1064 nm. Lens 622 focuses the seed light into the endcap 623 of fiber 624.

In some embodiments, the low-power pulsed infrared intermediate beam 697 is focused by lens 626 into an endcap of power-amplifier fiber 627 where it is amplified using pump light from power-amplifier pump laser 640 (which, in some embodiments, includes a plurality of laser diodes 648 that are directed into respective fibers that are joined by a fiber coupler into a single fiber, and output through a fiber-to-free-space couplers (e.g., in some embodiments, formed by a fused silica endcap) and collimated by lens 641 into a parallel beam that is reflected by dichroic beamsplitter 629 to lens 628 that focuses the pump beam in a counter-propagating direction (right-to-left in the diagram) to enter through a free-space-to-fiber coupler into fiber 627. Amplified signal pulses from the fiber (propagating in a left-to-right direction in FIG. 6) are collimated by lens 628 and pass through dichroic beam-splitter 629 to output as pulse beam 698, which is focused by lens 631 into non-linear crystal 632 (e.g., a conventional frequency-doubling device that changes the output wavelength to half (e.g., in some embodiments, from 1064 nm to 532 nm), as described above for FIG. 2A, the frequency-doubled pulses are collimated by lens 633 and output as pulsed beam 699.

In some embodiments, the high-power pulsed infrared intermediate beam 698 is frequency doubled from 1064.4 nm (IR) to 532.2 nm (green) by a non-linear crystal such as lithium borate (LBO). In some embodiments, the green output beam is used for any suitable purpose, such as possible medical purposes. In some embodiments, intermediate beam 698 includes 5000 Watts pulses (up to 10 Watts continuous) or more, and up to 50 percent or more of the intermediate beam 698 is converted to green light, resulting in green-light output of 2500 Watts peak (up to 5 Watts continuous) or more.

In some embodiments, isolator 619 (e.g., in some embodiments, Optical Isolator part number 211064 from Electro-Optics Technology, Inc., 5835 Shugart Lane, Traverse City, Mich. 49684 USA having a web address www.eotech.com) ensures unidirectional (clockwise direction in the figure) lasing in the ring laser 610. In some embodiments, the gain fiber 624 is ytterbium doped to lase at about 1064 nm (e.g., in some embodiments, about 2 meters of ytterbium-doped gain fiber part number Yb1200-25-250DC-PM from Liekki Corporation, Sorronrinne 9, FI-08500 Lohja, Finland, having a web address www.liekki.com). In some embodiments, the Q-switch modulator 615 is an RTP (rubidium titanyl phosphate) Pockels cell (e.g., in some embodiments, Q-Switch: RTP, 4×4×20 mm from Raicol Crystals Ltd., 15 Giron St., Industrial Zone, Yehud, 56217 Israel, with a web site at www.raicol.com (as described in detail previously for FIG. 2A).

In some embodiments, the ring-laser output beam 698 is focused by lens 631 into wavelength-conversion device 632 (in some embodiments, a frequency doubler that doubles the frequency, and thus halves the wavelength of the light from infrared at 1064 nm to green at 532 nm), and its output is collimated by lens 633 to form output beam 699. In some embodiments, a wavelength-selective dichroic mirror is used in the output beam 699 to pass the converted wavelengths and block any residual infrared wavelengths.

Figure 6B:
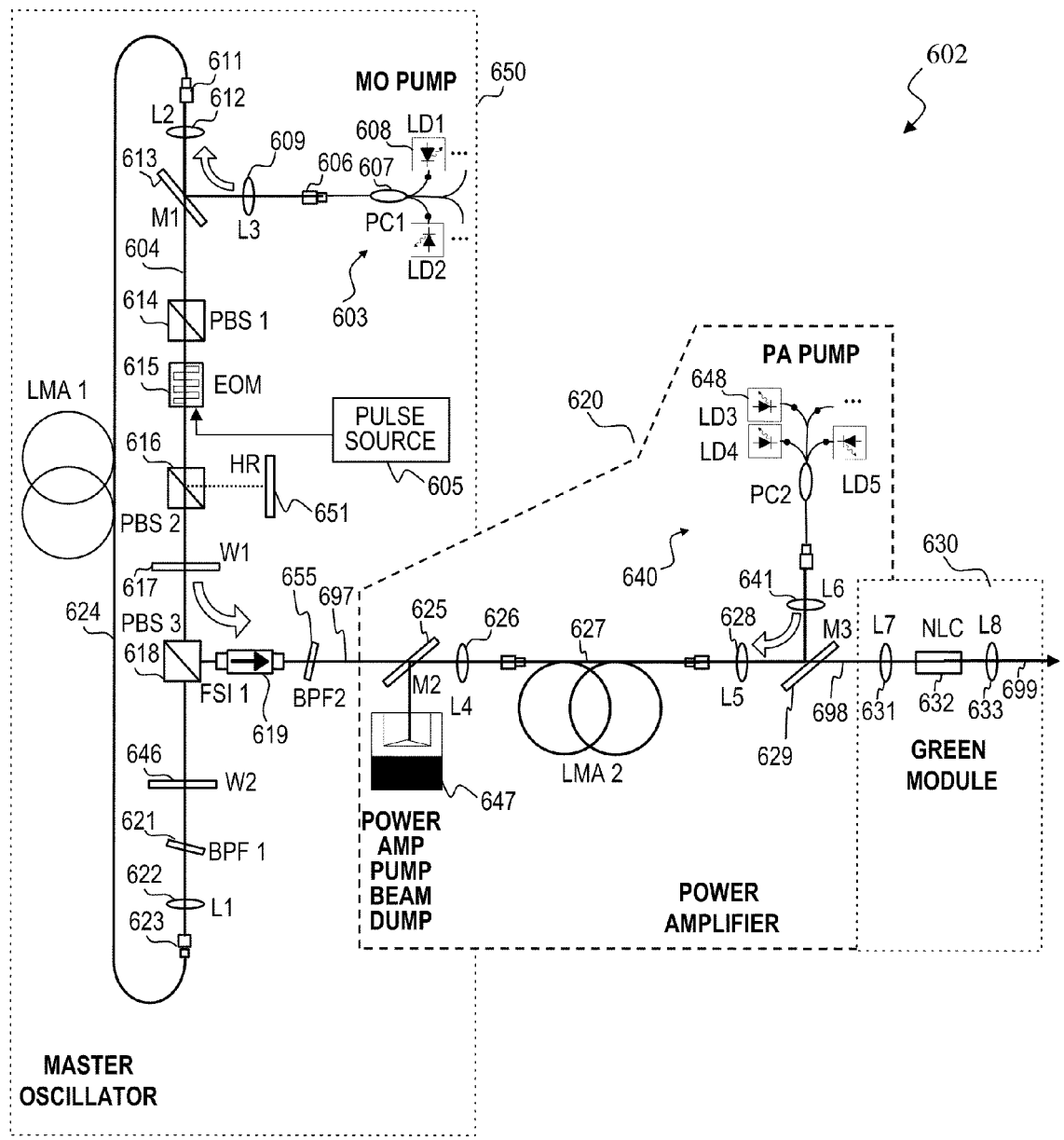
FIG. 6B is a block diagram of a visible-output system 602 using an IR ring laser 650.

FIG. 6B is a block diagram of a visible-output system 602 using an IR ring laser 650. In some embodiments, master oscillator 650 is substantially identical to master oscillator 610 of FIG. 6A, except that isolator 619 is omitted, and its function of forcing the lasing light to circulate only in a clockwise direction is provided by HR mirror 651 that is positioned to reflect any backward-traveling light that reflects from PBS 616. All other aspects of visible-output system 602 are the same as visible-output system 601 of FIG. 6A.

Figure 7:
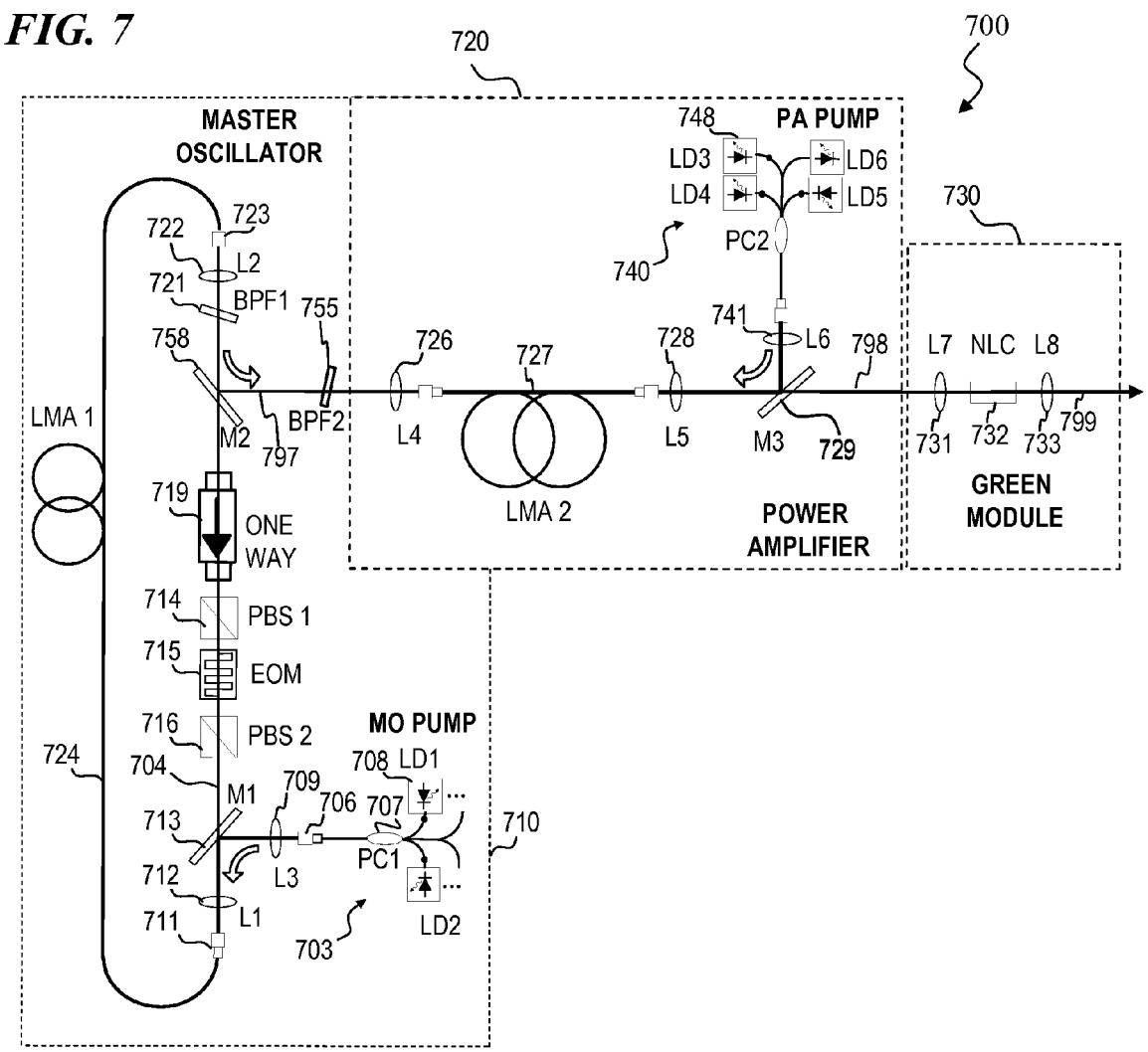
FIG. 7 is a block diagram of a visible-output system 700 using an IR ring laser 710.

FIG. 7 is a block diagram of a visible-output system 700 using an IR ring laser 710. In contrast to the power-oscillator operation of system 200 of FIG. 2A, the ring laser of FIG. 7 operates in a master-oscillator power-amplifier (MOPA) mode. In some embodiments, system 700 includes a Q-switched IR-signal fiber ring laser 710 that includes a rare-earth-doped (e.g., in some embodiments, ytterbium-doped) optical fiber 724 having fiber-to-free-space couplers (formed by fused silica endcap 723 and lens 722 (at the upper end in FIG. 7) and fused silica endcap 711 and lens 712 (at the lower end in FIG. 7)) that are used to form a free-space in-cavity beam 704. In the embodiment shown, ring laser 710 operates in a low-power master-oscillator mode, wherein the oscillator and power amplifier functions of the laser are separated, and power amplifier 720, external to the oscillator ring, generates the high-power pulse 798 from the output of the lower power ring laser 710. In some embodiments, ring laser 710 also includes a pump laser 703 (e.g., a moderately low-power diode laser that outputs a continuous-wave (cw) signal during operation of the laser) that, in some embodiments, includes a plurality of laser diodes 708 that are directed into respective fibers that are joined by a fiber coupler 707 into a single fiber, a dichroic beam splitter 713 that passes the signal wavelength (traveling in a clockwise direction in the figure) and reflects the pump light (also traveling in a clockwise direction in the figure) into the ring fiber 724 and exits the ring fiber 724 from fused silica endcap 723. In some embodiments, the signal wavelength continues (in the clockwise direction in the figure) in the free-space cavity through the collimating lens 721 through band-pass filter 721 (e.g., a Fabry-Perot interferometer having an angle-adjustable wavelength selectivity). In some embodiments, the wavelength spectrum of beam 704 is narrowed and determined by band-pass filter 721 (e.g., in some embodiments, a filter having a 0.7-nm-linewidth passband, such as a band-pass filter part number ACO-1064/5 Band-pass from Barr Associates, Inc., 2 Lyberty Way, Westford, Mass. 01886 USA, having a web address www.barrassociates.com). In some embodiments, a beam splitter 758 is used to output the infrared intermediate output beam 797 wherein the signal 797 is amplified by power amplifier 720 to form high-power output signal pulses 798 that exit through lens 731. In some embodiments the beam splitter 758 is used to reflect 80% of the free-space in-cavity beam 704 to the infrared intermediate output beam 797 into the power amplifier 720 and transmit 20% of the free-space in-cavity beam 704 to seed further lasing. In some embodiments, low-power infrared intermediate output beam 797 passes through a second band-pass filter 755 before entering the power amplifier 720. In some embodiments the wavelength spectrum of low-power infrared intermediate output beam 797 is narrowed and determined by band-pass filter 755 (e.g., in some embodiments, a filter having a 1.0-1.5-nm-linewidth passband).

In the master oscillator ring 710, the clockwise-traveling signal light continues through an optical isolator 719 used to obtain unidirectional (in a clockwise direction, in the embodiment shown) signal in the ring laser, a first polarizing beam splitter 714, Q-switch modulator 715, and a second polarizing beam splitter 716. In some embodiments, the pump light from pump laser 703 propagates in the same direction relative to beam 704, and is launched or combined (in the clockwise direction in the figure) into the ring beam 704 by dichroic beam splitter 713 (e.g., in some embodiments, a dichroic beam splitter mirror, such as part number R980/T1064BS1.0 from Barr Associates, Inc.). In some embodiments, beam splitters 714 and 716 are polarizing beam-splitting (PBS) cubes (e.g., in some embodiments, part number PBS-1064-010 from CVI Laser, LLC). In some embodiments, PBS 714 (in other embodiments, this beam splitter 614 is a Glan-Thompson polarizer (walk-off) rather than part number PBS-1064-010) cleans up the polarization of the signal light before it enters modulator 715 (e.g., an electro-optic RTP Q-switch), while the second PBS 716 is used with the modulator 715 to pass or block the signal beam 704. In some embodiments, gain fiber 724 is a polarizing/polarization-maintaining amplifying fiber, e.g., in some embodiments, one that includes two "stress rods", one on either side of its 25-micron core in a 250-micron-diameter fiber, to promote and maintain polarized amplification in the fiber. In some embodiments, the band-pass filter 721 is a 0.7-nm-linewidth thin-film interferometer set at angle to select the desired wavelength (e.g., a filter that at a normal angle passes 1080-nm light, but set at an angle of about ten degrees, in order to pass 1064 nm. Lens 712 focuses the seed light into the endcap 711 of fiber 724.

In some embodiments, the low-power pulsed infrared intermediate beam 797 is focused by lens 726 into an endcap of power-amplifier fiber 727 where it is amplified using pump light from power-amplifier pump laser 740 (which, in some embodiments, includes a plurality of laser diodes 748 that are directed into respective fibers that are joined by a fiber coupler into a single fiber, and output through a fiber-to-free-space couplers (e.g., in some embodiments, formed by a fused silica endcap) and collimated by lens 741 into a parallel beam that is reflected by dichroic beamsplitter 729 to lens 728 that focuses the pump beam in a counter-propagating direction (right-to-left in the diagram) to enter through a free-space-to-fiber coupler into fiber 727. Amplified signal pulses from the fiber (propagating in a left-to-right direction in FIG. 7) are collimated by lens 728 and pass through dichroic beamsplitter 729 to output as pulse beam 798, which is focused by lens 731 into non-linear crystal 732 (e.g., a conventional frequency-doubling device that changes the output wavelength to half (e.g., in some embodiments, from 1064 nm to 532 nm), as described above for FIG. 2A, the frequency-doubled pulses are collimated by lens 733 and output as pulsed beam 799.

In some embodiments, the high-power pulsed infrared intermediate beam 798 is frequency doubled from 1064.4 nm (IR) to 532.2 nm (green) by a non-linear crystal such as lithium borate (LBO). In some embodiments, the green output beam is used for any suitable purpose, such as possible medical purposes. In some embodiments, intermediate beam 798 includes 5000 Watts pulses (up to 10 Watts continuous) or more, and up to 50 percent or more of the intermediate beam 698 is converted to green light, resulting in green-light output of 2500 Watts peak (up to 5 Watts continuous) or more.

In some embodiments, the gain fiber 724 is ytterbium doped to lase at about 1064 nm (e.g., in some embodiments, about 2 meters of ytterbium-doped gain fiber part number Yb1200-25-250DC-PM from Liekki Corporation, Sorronrinne 9, FI-08500 Lohja, Finland, having a web address www.liekki.com). In some embodiments, the Q-switch modulator 715 is an RTP (rubidium titanyl phosphate) Pockels cell (e.g., in some embodiments, Q-Switch: RTP, 4×4×20 mm from Raicol Crystals Ltd., 15 Giron St., Industrial Zone, Yehud, 56217 Israel, with a web site at www.raicol.com (as described in detail previously for FIG. 2A). In some embodiments, at repetition rates of 50 KHz, the noise due to piezo-electric ringing is less than 3% while that in BBO it is 10% when operated at 30 KHz. However in RTP Pockels cells, the half-wave voltage is about 40% of that of BBO Pockels cell.)

In some embodiments, the ring-laser output beam 798 is focused by lens 731 into wavelength-conversion device 732 (in some embodiments, a frequency doubler that doubles the frequency, and thus halves the wavelength of the light from infrared at 1064 nm to green at 532 nm), and its output is collimated by lens 733 to form output beam 799. In some embodiments, a wavelength-selective dichroic mirror is used in the output beam 799 to pass the converted wavelengths and block any residual infrared wavelengths.

Figure 8A:
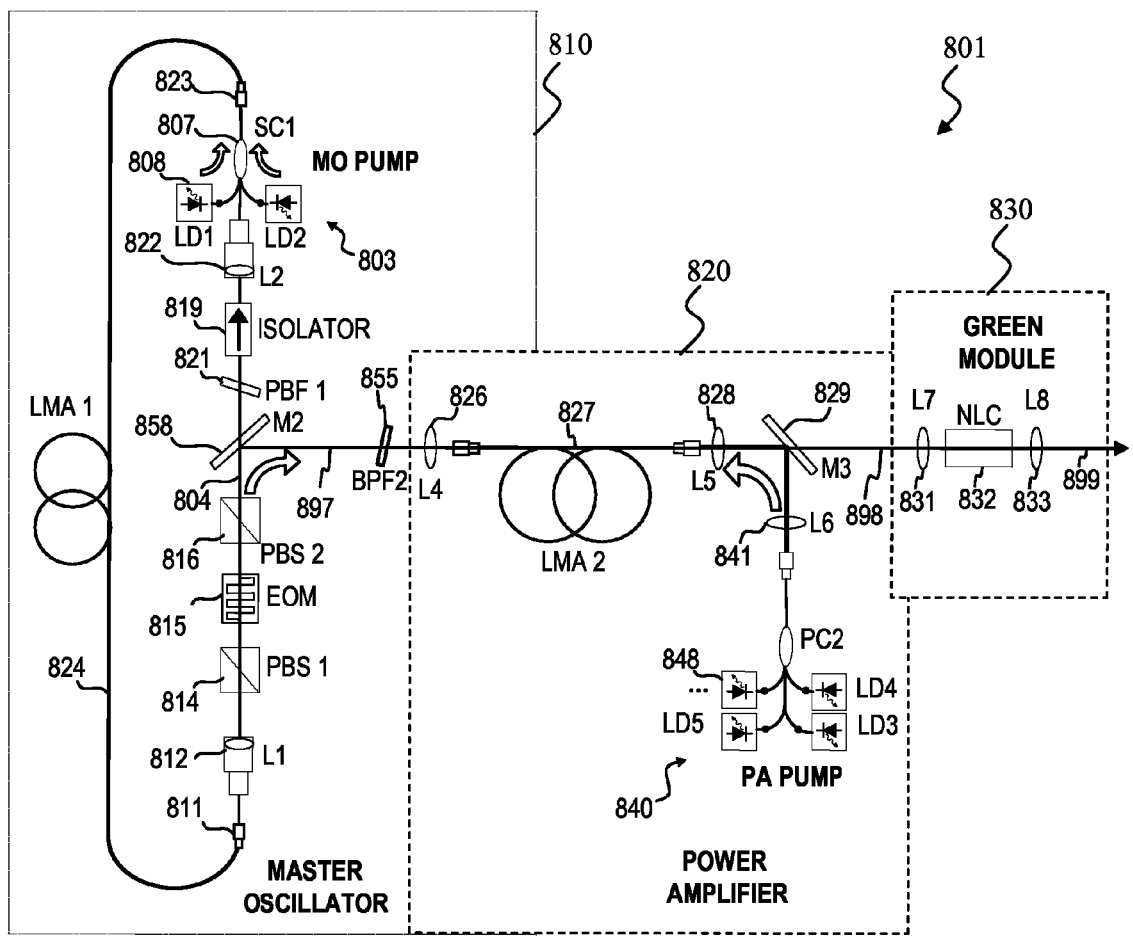
FIG. 8A is a block diagram of a visible-output system 801 using an IR ring laser 810.

FIG. 8A is a block diagram of a visible-output system 801 using an IR ring laser 810. In contrast to the power-oscillator operation of system 200 of FIG. 2A, the ring laser of FIG. 8A operates in a master-oscillator power-amplifier (MOPA) mode. In some embodiments, system 801 includes a Q-switched IR-signal fiber ring laser 810 that includes a rare-earth-doped (e.g., in some embodiments, ytterbium-doped) optical fiber 824 having fiber-to-free-space couplers (formed by fused silica endcap 823 and lens 822 and fused silica endcap 811 and lens 812 (at the upper end in FIG. 6)) that are used to form a free-space in-cavity beam 804. In the embodiment shown, ring laser 810 operates in a low-power master-oscillator mode, wherein the oscillator and power amplifier functions of the laser are separated, and power amplifier 820, external to the oscillator ring, generates the high-power pulse 898 from the output of the lower power ring laser 810. In some embodiments, ring laser 810 also includes a pump laser 809 (e.g., a moderately low-power diode laser that outputs a continuous-wave (cw) signal during operation of the laser) that, in some embodiments, includes a plurality of laser diodes 808 that are directed into respective fibers that are joined by a fiber star coupler 807 into a single fiber. In some embodiments, the fiber star coupler 807 joins the plurality of laser diodes 808 and the output fiber from lens 822 to form a single fiber wherein the signal beam and the pump light propagate in the ring fiber 824 in the same direction (in a counter-clockwise direction, in the embodiment shown). In some embodiments an optical isolator 819 is used to obtain unidirectional (in a counter-clockwise direction, in the embodiment shown) signal in the ring laser. The free-space in-cavity beam continues from the isolator 819 through a first polarizing beam splitter 814, a Q-switch modulator 815 driven by a pulsed driving voltage, a second polarizing beam splitter 816, and beam splitter 858 used to output the infrared intermediate output beam 897 wherein the signal 897 is amplified by power amplifier 820 to form high-power output signal pulses 898 that exit through lens 831. In some embodiments, a beam splitter 858 is used to output the infrared intermediate output beam 897 wherein the signal 897 is amplified by power amplifier 820 to form high-power output signal pulses 898 that exit through lens 831. In some embodiments the beam splitter 858 is used to reflect 80% of the free-space in-cavity beam 804 to the infrared intermediate output beam 897 into the power amplifier 820 and transmit 20% of the free-space in-cavity beam 804 to seed further lasing. In some embodiments, low-power infrared intermediate output beam 897 passes through a second band-pass filter 855 before entering the power amplifier 820. In some embodiments the wavelength spectrum of low-power infrared intermediate output beam 897 is narrowed and determined by band-pass filter 855 (e.g., in some embodiments, a filter having a 1.0-1.5-nm-linewidth passband).

In the master oscillator ring 810 the seed light (traveling in the counter-clockwise direction in the figure) continues from the beam splitter 858 through band-pass filter 821 (e.g., a Fabry-Perot interferometer having an angle-adjustable wavelength selectivity). In some embodiments, the wavelength spectrum of beam 804 is narrowed and determined by band-pass filter 821 (e.g., in some embodiments, a filter having a 0.7-nm-linewidth passband, such as a band-pass filter part number ACO-1064/5 Band-pass from Barr Associates, Inc., 2 Lyberty Way, Westford, Mass. 01886 USA, having a web address www.barrassociates.com). In some embodiments, the pump light from pump laser 809 propagates in the same direction relative to beam 804, and is launched or combined (in the counter-clockwise direction in the figure) into the ring beam 804 by fiber star coupler 807. In some embodiments, beam splitters 814 and 816 are polarizing beam-splitting (PBS) cubes (e.g., in some embodiments, part number PBS-1064-010 from CVI Laser, LLC). In some embodiments, PBS 814 (in other embodiments, this beam splitter 814 is a Glan-Thompson polarizer (walk-off) rather than part number PBS-1064-010) cleans up the polarization of the signal light before it enters modulator 815 (e.g., an electro-optic RTP Q-switch), while the second PBS 816 is used with the modulator 815 to pass or block the signal beam 804. In some embodiments, gain fiber 824 is a polarizing/polarization-maintaining amplifying fiber, e.g., in some embodiments, one that includes two "stress rods", one on either side of its 25-micron core in a 250-micron-diameter fiber, to promote and maintain polarized amplification in the fiber. In some embodiments, the band-pass filter 821 is a 0.7-nm-linewidth thin-film interferometer set at angle to select the desired wavelength (e.g., a filter that at a normal angle passes 1080-nm light, but set at an angle of about ten degrees, in order to pass 1064 nm. Lens 822 focuses the seed light into one fiber entering the star coupler 807 of fiber 824.

In some embodiments, the low-power pulsed infrared intermediate beam 897 is focused by lens 826 into an endcap of power-amplifier fiber 827 where it is amplified using pump light from power-amplifier pump laser 840 (which, in some embodiments, includes a plurality of laser diodes 848 that are directed into respective fibers that are joined by a fiber coupler into a single fiber, and output through a fiber-to-free-space couplers (e.g., in some embodiments, formed by a fused silica endcap) and collimated by lens 841 into a parallel beam that is reflected by dichroic beamsplitter 829 to lens 828 that focuses the pump beam in a counter-propagating direction (left-to-right in the diagram) to enter through a free-space-to-fiber coupler into fiber 827. Amplified signal pulses from fiber 827 (propagating in a left-to-right direction in FIG. 8) are collimated by lens 828 and pass through dichroic beamsplitter 829 to output as pulse beam 898, which is focused by lens 831 into non-linear crystal 832 (e.g., a conventional frequency-doubling device that changes the output wavelength to half (e.g., in some embodiments, from 1064 nm to 532 nm), as described above for FIG. 2A, the frequency-doubled pulses are collimated by lens 833 and output as pulsed beam 899.

In some embodiments, the high-power pulsed infrared intermediate beam 898 is frequency doubled from 1064.4 nm (IR) to 532.2 nm (green) by a non-linear crystal such as lithium borate (LBO). In some embodiments, the green output beam is used for any suitable purpose, such as possible medical purposes. In some embodiments, intermediate beam 898 includes 5000 Watts pulses (up to 10 Watts continuous) or more, and up to 50 percent or more of the intermediate beam 898 is converted to green light, resulting in green-light output of 2500 Watts peak (up to 5 Watts continuous) or more.

In some embodiments, isolator 819 (e.g., in some embodiments, Optical Isolator part number 211064 from Electro-Optics Technology, Inc., 5835 Shugart Lane, Traverse City, Mich. 49684 USA having a web address www.eotech.com) ensures unidirectional (clockwise direction in the figure) lasing in the ring laser 810. In some embodiments, the gain fiber 824 is ytterbium doped to lase at about 1064 nm (e.g., in some embodiments, about 2 meters of ytterbium-doped gain fiber part number Yb1200-25-250DC-PM from Liekki Corporation, Sorronrinne 9, FI-08500 Lohja, Finland, having a web address www.liekki.com). In some embodiments, the Q-switch modulator 815 is an RTP (rubidium titanyl phosphate) Pockels cell (e.g., in some embodiments, Q-Switch: RTP, 4×4×20 mm from Raicol Crystals Ltd., 15 Giron St., Industrial Zone, Yehud, 56217 Israel, with a web site at www.raicol.com (e.g., Their Q-switch is built using two RTP elements in a temperature-compensating design as described in detail previously for FIG. 6. In some embodiments, at repetition rates of 50 KHz, the noise due to piezo-electric ringing is less than 3% while that in BBO it is 10% when operated at 30 KHz. However in RTP Pockels cells, the half-wave voltage is about 40% of that of BBO Pockels cell.)

In some embodiments, the ring-laser output beam 898 is focused by lens 831 into wavelength-conversion device 832 (in some embodiments, a frequency doubler that doubles the frequency, and thus halves the wavelength of the light from infrared at 1064 nm to green at 532 nm), and its output is collimated by lens 833 to form output beam 899. In some embodiments, a wavelength-selective dichroic mirror is used in the output beam 899 to pass the converted wavelengths and block any residual infrared wavelengths.

Figure 8B:
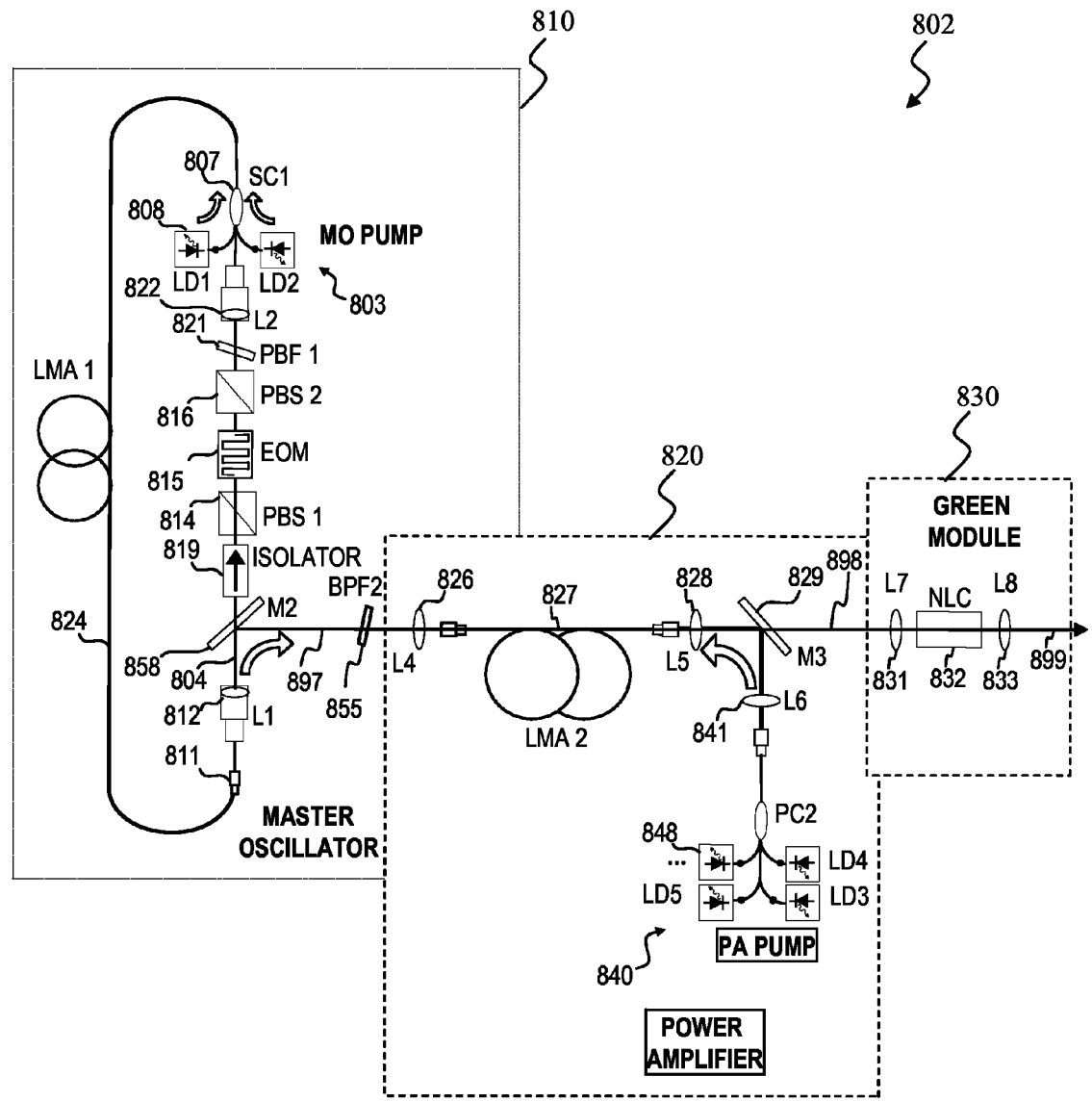
FIG. 8B is a block diagram of a visible-output system 802 using an IR ring laser 810.

FIG. 8B is a block diagram of a visible-output system 802 using an IR ring laser 810. In contrast to the power-oscillator operation of system 200 of FIG. 2A and system 201 of FIG. 2B, the ring laser of FIG. 8B operates in a master-oscillator power-amplifier (MOPA) mode. In some embodiments, system 802 includes a Q-switched IR-signal fiber ring laser 810 that includes a rare-earth-doped (e.g., in some embodiments, ytterbium-doped) optical fiber 824 having fiber-to-free-space couplers (formed by fused silica endcap 823 and lens 822 and fused silica endcap 811 and lens 812) that are used to form a free-space in-cavity beam 804. In the embodiment shown, ring laser 810 operates in a low-power master-oscillator mode, wherein the oscillator and power amplifier functions of the laser are separated, and power amplifier 820, external to the oscillator ring, generates the high-power pulse 898 from the output of the lower power ring laser 810. In some embodiments, ring laser 810 also includes a pump laser 803 (e.g., a moderately low-power diode laser that outputs a continuous-wave (cw) signal during operation of the laser) that, in some embodiments, includes a plurality of laser diodes 808 that are directed into respective fibers that are joined by a fiber star coupler 807 into a single fiber. In some embodiments, the fiber star coupler 807 joins the plurality of laser diodes 808 and the output fiber from connector 822 to form a single fiber wherein the signal beam and the pump light propagate in the ring fiber 824 in the same direction (in a counter-clockwise direction, in the embodiment shown).

In some embodiments, the signal beam traveling through ring fiber 824 exits the fiber 824 through fused silica endcap 811, is collimated by lens 812 and beam splitter 858 is used to output the infrared intermediate output beam 897 wherein the signal 897 is amplified by power amplifier 820 to form high-power output signal pulses 898 that exit through lens 831. In some embodiments, a beam splitter 858 is used to output the infrared intermediate output beam 897 wherein the signal 897 is amplified by power amplifier 820 to form high-power output signal pulses 898 that exit through lens 831. In some embodiments the beam splitter 858 is used to reflect 80% of the free-space in-cavity beam 804 to the infrared intermediate output beam 897 into the power amplifier 820 and transmit 20% of the free-space in-cavity beam 804 to seed further lasing. In some embodiments, low-power infrared intermediate output beam 897 passes through a second band-pass filter 855 before entering the power amplifier 820. In some embodiments the wavelength spectrum of low-power infrared intermediate output beam 897 is narrowed and determined by band-pass filter 855 (e.g., in some embodiments, a filter having a 1.0-1.5-nm-linewidth passband).

In the master oscillator ring 810 the seed light (traveling in the counter-clockwise direction in the figure) continues from the beam splitter 858 through an optical isolator 819 used to obtain unidirectional (in a counter-clockwise direction, in the embodiment shown) signal in the ring laser, first polarizing beam splitter 814, Q-switch modulator 815 driven by a pulsed driving voltage, a second polarizing beam splitter 816, band-pass filter 821 (e.g., a Fabry-Perot interferometer having an angle-adjustable wavelength selectivity). In some embodiments, the wavelength spectrum of beam 804 is narrowed and determined by band-pass filter 821 (e.g., in some embodiments, a filter having a 0.7-nm-linewidth passband, such as a band-pass filter part number ACO-1064/5 Band-pass from Barr Associates, Inc., 2 Lyberty Way, Westford, Mass. 01886 USA, having a web address www.barrassociates.com). In some embodiments, the pump light from pump laser 803 propagates in the same direction relative to beam 804, and is launched or combined (in the counter-clockwise direction in the figure) into the ring beam 804 by fiber star coupler 807. In some embodiments, beam splitters 814 and 816 are polarizing beam-splitting (PBS) cubes (e.g., in some embodiments, part number PBS-1064-010 from CVI Laser, LLC). In some embodiments, PBS 814 (in other embodiments, this beam splitter 814 is a Glan-Thompson polarizer (walk-off) rather than part number PBS-1064-010) cleans up the polarization of the signal light before it enters modulator 815 (e.g., an electro-optic RTP Q-switch), while the second PBS 816 is used with the modulator 815 to pass or block the signal beam 804. In some embodiments, gain fiber 824 is a polarizing/polarization-maintaining amplifying fiber, e.g., in some embodiments, one that includes two "stress rods," one on either side of its 25-micron core in a 250-micron-diameter fiber, to promote and maintain polarized amplification in the fiber. In some embodiments, the band-pass filter 821 is a 0.7-nm-linewidth thin-film interferometer set at angle to select the desired wavelength (e.g., a filter that at a normal angle passes 1080-nm light, but set at an angle of about ten degrees, in order to pass 1064 nm. Lens 822 focuses the seed light into the star coupler 807 of fiber 824.

In some embodiments, the low-power pulsed infrared intermediate beam 897 is focused by lens 826 into an endcap of power-amplifier fiber 827 where it is amplified using pump light from power-amplifier pump laser 840 (which, in some embodiments, includes a plurality of laser diodes 848 that are directed into respective fibers that are joined by a fiber coupler into a single fiber, and output through a fiber-to-free-space couplers (e.g., in some embodiments, formed by a fused silica endcap) and collimated by lens 841 into a parallel beam that is reflected by dichroic beamsplitter 829 to lens 828 that focuses the pump beam in a counter-propagating direction (left-to-right in the diagram) to enter through a free-space-to-fiber coupler into fiber 827. Amplified signal pulses from fiber 827 (propagating in a left-to-right direction in FIG. 8) are collimated by lens 828 and pass through dichroic beamsplitter 829 to output as pulse beam 898, which is focused by lens 831 into non-linear crystal 832 (e.g., a conventional frequency-doubling device that changes the output wavelength to half (e.g., in some embodiments, from 1064 nm to 532 nm), as described above for FIG. 2A, the frequency-doubled pulses are collimated by lens 833 and output as pulsed beam 899.

In some embodiments, the high-power pulsed infrared intermediate beam 898 is frequency doubled from 1064.4 nm (IR) to 532.2 nm (green) by a non-linear crystal such as lithium borate (LBO). In some embodiments, the green output beam is used for any suitable purpose, such as possible medical purposes. In some embodiments, intermediate beam 898 includes 5000 Watts pulses (up to 10 Watts continuous) or more, and up to 50 percent or more of the intermediate beam 898 is converted to green light, resulting in green-light output of 2500 Watts peak (up to 5 Watts continuous) or more.

In some embodiments, isolator 819 (e.g., in some embodiments, Optical Isolator part number 211064 from Electro-Optics Technology, Inc., 5835 Shugart Lane, Traverse City, Mich. 49684 USA having a web address www.eotech.com) ensures unidirectional (clockwise direction in the figure) lasing in the ring laser 810. In some embodiments, the gain fiber 824 is ytterbium doped to lase at about 1064 nm (e.g., in some embodiments, about 2 meters of ytterbium-doped gain fiber part number Yb1200-25-250DC-PM from Liekki Corporation, Sorronrinne 9, FI-08500 Lohja, Finland, having a web address www.liekki.com). In some embodiments, the Q-switch modulator 815 is an RTP (rubidium titanyl phosphate) Pockels cell (e.g., in some embodiments, Q-Switch: RTP, 4×4×20 mm from Raicol Crystals Ltd., 15 Giron St., Industrial Zone, Yehud, 56217 Israel, with a web site at www.raicol.com (e.g., Their Q-switch is built using two RTP elements in a temperature-compensating design as described in detail previously for FIG. 6. In some embodiments, at repetition rates of 50 KHz, the noise due to piezo-electric ringing is less than 3% while that in BBO it is 10% when operated at 30 KHz. However in RTP Pockels cells, the half-wave voltage is about 40% and the hold-off is about 25% of that of BBO Pockels cell.)

In some embodiments, the ring-laser output beam 898 is focused by lens 831 into wavelength-conversion device 832 (in some embodiments, a frequency doubler that doubles the frequency, and thus halves the wavelength of the light from infrared at 1064 nm to green at 532 nm), and its output is collimated by lens 833 to form output beam 899. In some embodiments, a wavelength-selective dichroic mirror is used in the output beam 899 to pass the converted wavelengths and block any residual infrared wavelengths.

Figure 9:
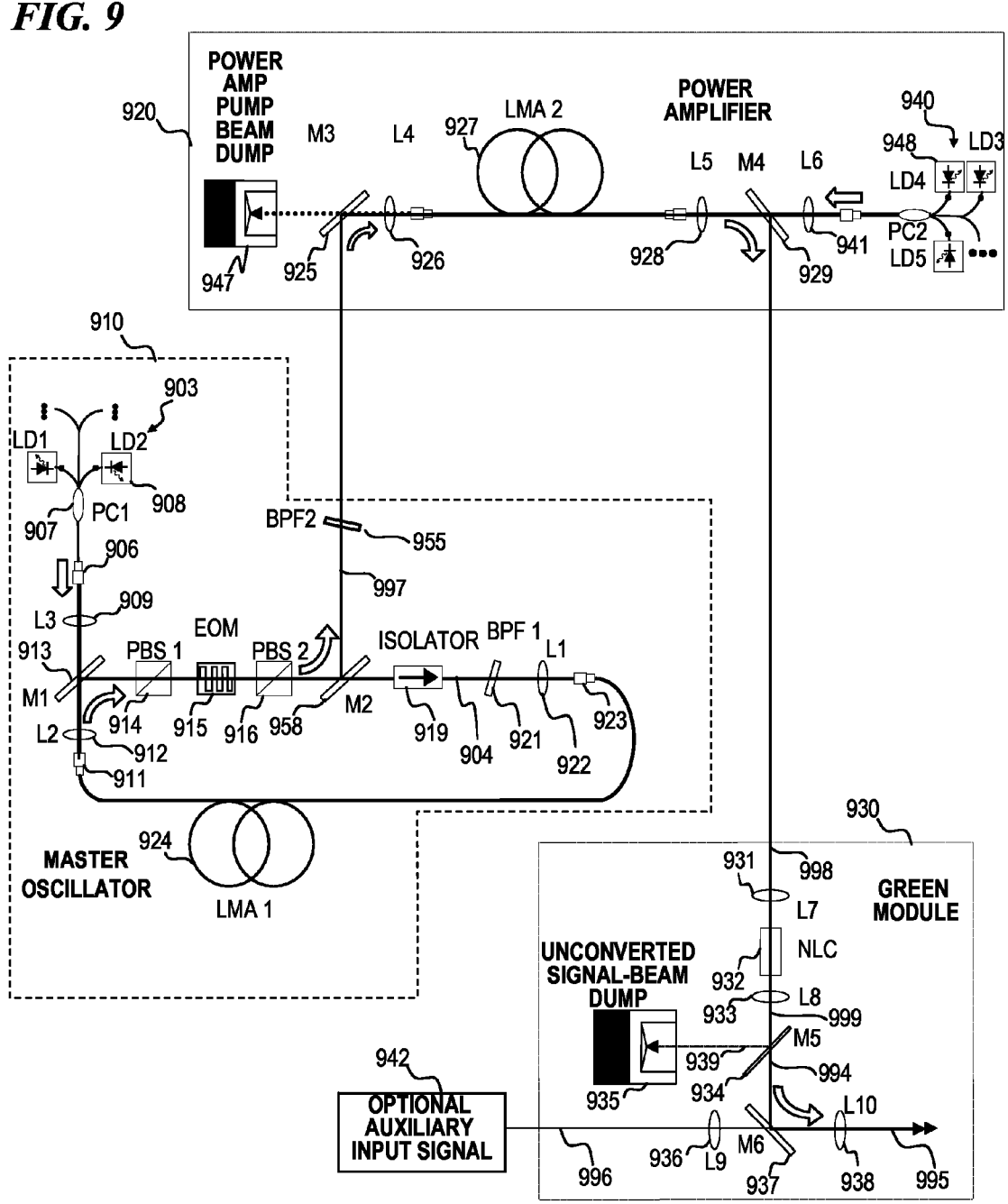
FIG. 9 is a block diagram of a visible-output system 900 using an IR ring laser 910.

FIG. 9 is a block diagram of a visible-output system 900 operated in master-oscillator-power-amplifier (MOPA) mode using an IR fiber ring laser 910. In some embodiments, system 900 includes a Q-switched IR-signal fiber ring laser 910 that includes a rare-earth-doped (e.g., in some embodiments, ytterbium-doped) optical fiber 924 having fiber-to-free-space couplers (formed by fused silica endcap 923 and lens 922 and fused silica endcap 911 and lens 912) that are used to form a free-space in-cavity beam 904. In the embodiment shown, ring laser 910 operates in a low-power master-oscillator mode, wherein the oscillator and power amplifier functions of the laser are separated, and power amplifier 920, external to the oscillator ring, generates the high-power pulse 998 from the output of the upper power ring laser 920.

In some embodiments, ring laser 910 also includes a pump laser 909 (e.g., a moderately low-power diode laser that outputs a continuous-wave (cw) signal during operation of the laser), a dichroic beam splitter 913 that reflects the signal wavelength (traveling in a clockwise direction in the figure) but transmits the pump light in a counter-propagating counter-clockwise direction into the ring fiber 924. In some embodiments a first polarizing beam splitter 914, Q-switch modulator 915 driven by a pulsed driving voltage, a second polarizing beam splitter 916, a beam splitter 958 is used to output the infrared intermediate output beam 997 wherein the signal 997 is amplified by power amplifier 920 to form high-power output signal pulses 998 that exit through lens 931. In some embodiments the beam splitter 958 is used to reflect 80% of the free-space in-cavity beam 904 to the infrared intermediate output beam 997 into the power amplifier 920 and transmit 20% of the free-space in-cavity beam 904 to seed further lasing. In some embodiments, low-power infrared intermediate output beam 997 passes through a second band-pass filter 955 before entering the power amplifier 920. In some embodiments the wavelength spectrum of low-power infrared intermediate output beam 997 is narrowed and determined by band-pass filter 955 (e.g., in some embodiments, a filter having a 1.0-1.5-nm-linewidth passband).

In the master oscillator ring 910 the seed light continues from the beam splitter 958 through optical isolator 919 used to obtain unidirectional (in a clockwise direction, in the figure shown) signal in the ring laser, and further continues through band-pass filter 921 (e.g., a Fabry-Perot interferometer having an angle-adjustable wavelength selectivity). In some embodiments, the wavelength spectrum of beam 904 is narrowed and determined by band-pass filter 921 (e.g., in some embodiments, a filter having a 0.7-nm-linewidth passband, such as a band-pass filter part number ACO-1064/5 Bandpass from Barr Associates, Inc., 2 Lyberty Way, Westford, Mass. 01886 USA, having a web address www.barrassociates.com). In some embodiments, the pump light from pump laser 909 counter-propagates relative to beam 904, and is launched or combined (in the counter-clockwise direction in the figure) into the ring beam 904 by dichroic beam splitter 913 (e.g., in some embodiments, a dichroic beam splitter mirror, such as part number R980/T1064BS1.0 from Barr Associates, Inc.). In some embodiments, beam splitters 914 and 916 are polarizing beam-splitting (PBS) cubes (e.g., in some embodiments, part number PBS-1064-010 from CVI Laser, LLC). In some embodiments, PBS 914 (in other embodiments, this beam splitter 914 is a Glan-Thompson polarizer (walk-off) rather than part number PBS-1064-010) cleans up the polarization of the signal light before it enters modulator 915 (e.g., an electro-optic RTP Q-switch), while the second PBS 916 is used with the modulator 915 to pass or block the signal beam 904. In some embodiments, gain fiber 924 is a polarizing/polarization-maintaining amplifying fiber, e.g., in some embodiments, one that includes two "stress rods," one on either side of its 25-micron core in a 250-micron-diameter fiber, to promote and maintain polarized amplification in the fiber. In some embodiments, the band-pass filter 921 is a 0.7-nm-linewidth thin-film interferometer set at angle to select the desired wavelength (e.g., a filter that at a normal angle passes 1080-nm light, but set at an angle of about ten degrees, in order to pass 1064 nm. Lens 922 focuses the seed light into the endcap 923 of fiber 924.

In some embodiments, the low-power pulsed infrared intermediate beam 997 is reflected by dichroic beam splitter 925 and focused by lens 926 into an endcap of power-amplifier fiber 927 where it is amplified using pump light from power-amplifier pump laser 940 which, in some embodiments, includes a plurality of laser diodes 948 that are directed into respective fibers that are joined by a fiber coupler into a single fiber, and output through a fiber-to-free-space couplers (e.g., in some embodiments, formed by a fused silica endcap) and collimated by lens 941 into a parallel beam that is transmitted by dichroic beam splitter 929 to lens 928 that focuses the pump beam in a counter-propagating direction (left-to-right in the figure) to enter through a free-space-to-fiber coupler through fiber 927 and output through a fiber-to-free-space coupler through collimating lens 926 and then pass through dichroic beam splitter 925 to be collected at power amp pump beam dump 947. Amplified signal pulses from fiber 927 (propagating in a left-to-right direction in FIG. 9) are collimated by lens 928 and are reflected by dichroic beam splitter 929 to output as pulse beam 998, which is focused by lens 931 into non-linear crystal 932 (e.g., a conventional frequency-doubling device that changes the output wavelength to half (e.g., in some embodiments, from 1064 nm to 532 nm), the frequency-doubled pulses are collimated by lens 933, pass through dichroic beam splitter 934 and output as pulsed beam 999. In some embodiments, the high-power pulsed infrared intermediate beam 998 is frequency doubled from 1064.4 nm (IR) to 532.2 nm (green) by a non-linear crystal such as lithium borate (LBO). In some embodiments, intermediate beam 998 includes 5000 Watts pulses (up to 10 Watts continuous) or more, and up to 50 percent or more of the intermediate beam 998 is converted to green light, resulting in green-light output of 2500 Watts peak (up to 5 Watts continuous) or more. In some embodiments, after the intermediate beam 998 passes through the non-linear crystal 932 some of the signal-beam remains unconverted to the shorter wavelength wherein the intermediate beam 999 is comprised of both converted and non-converted light and the unconverted signal-beam 939 is reflected by the dichroic beam splitter 934 into the unconverted signal-beam dump and the converted green pulsed beam 994 is transmitted through the dichroic beam splitter 934. In some embodiments, the converted green pulsed beam 994 is reflected by dichroic beam splitter 937, focused by lens 938 and output as output beam 995.

In some embodiments, Green Module 930 includes an optional auxiliary input signal 942 that includes auxiliary signal beam 996 (e.g., in some embodiments the auxiliary signal beam is generated by a low power continuous-wave semiconductor diode laser with a wavelength that is substantially different from the wavelength of converted green pulsed beam 994) that (traveling from left-to-right in the figure) is collimated by lens 936, passes through dichroic beam splitter 937 and is focused by lens 938 into output beam 995. In some embodiments, output beam 995 includes green pulsed beam 994 co-axially aligned with auxiliary input signal beam 996.

In some embodiments, the green pulsed beam 994 is used for any suitable purpose, such as possible medical purposes. In some embodiments the auxiliary input signal beam 996 is used for any suitable purpose, such as providing a means of aligning the green output beam 999 during a medical process.

Figure 10A:
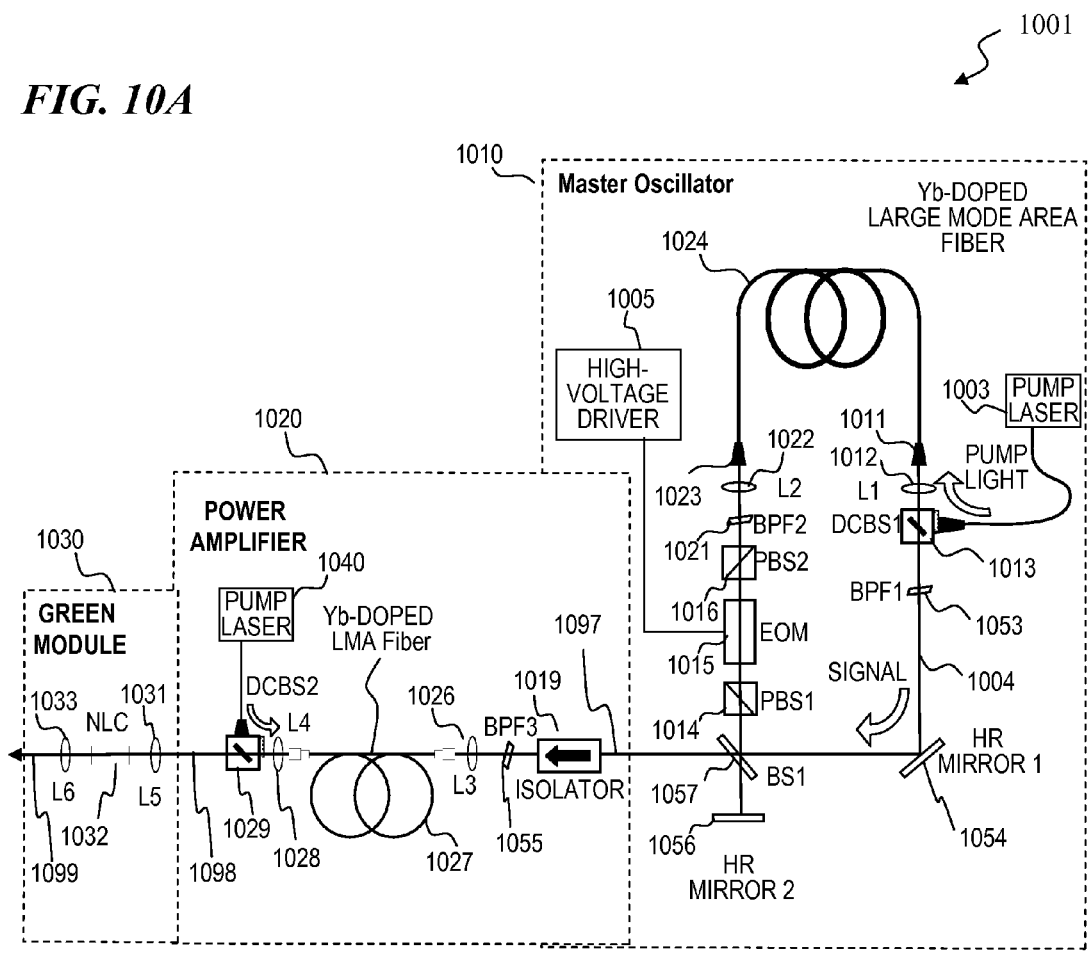
FIG. 10A is a block diagram of a visible-output system 1001 using an IR ring laser 1010.

FIG. 10A is a block diagram of a visible-output system 1000 operated in master-oscillator-power-amplifier (MOPA) mode using an IR fiber ring laser 1010. In some embodiments, system 1000 includes a Q-switched IR-signal fiber ring laser 1010 that includes a rare-earth-doped (e.g., in some embodiments, ytterbium-doped) optical fiber 1024 having fiber-to-free-space couplers (formed by fused silica endcap 1023 and lens 1022 and fused silica endcap 1011 and lens 1012) that are used to form a free-space in-cavity beam 1004. In the embodiment shown, ring laser 1010 operates in a low-power master-oscillator mode, wherein the oscillator and power amplifier functions of the laser are separated, and power amplifier 1020, external to the oscillator ring, generates the high-power pulse 1098 from the output of the power ring laser 1020. In some embodiments (as is the cases for some embodiments of all of the systems described herein that show a frequency-doubler (green) module), the green module 1030 is omitted (to use the high-power pulse 1098 directly for the desired function of the system) or is replaced by another wavelength conversion device (such as a frequency tripler, quadrupler, or quintupler (some of which can also output other intermediate wavelengths) or an OPO (which can output 1, 2, or 3 different wavelengths from different ports)).

In some embodiments, ring laser 1010 also includes a pump laser 1003 (e.g., a moderately low-power diode laser that outputs a continuous-wave (cw) signal during operation of the laser), a dichroic beam splitter 1013 that transmits the signal wavelength (traveling in a clockwise direction in the figure) but reflects the pump light in a counter-propagating counter-clockwise direction into the ring fiber 1024. In some embodiments the signal wavelength exits the optical fiber 1024 (in a clockwise direction as shown in the figure) through endcap 1011, is focused by lens 1012, is transmitted through dichroic beam splitter 1013, passes through a first band-pass filter 1053, is reflected by high-reflectivity mirror 1054 and is output by beam splitter 1057 to the infrared intermediate output beam 1097 wherein the signal 1097 is amplified by power amplifier 1020 to form high-power output signal pulses 1098 that exit through lens 1031. In some embodiments the infrared intermediate output beam 1097 passes through an isolator 1019 and a third band-pass filter 1027 before being focused by lens 1026 into optical fiber 1027 where signal 1097 is amplified by pump light from power amplifier pump laser 1040. In some embodiments the beam splitter 1057 is used to transmit about 70% to about 90% of the free-space in-cavity beam 1004 to the infrared intermediate output beam 1097 into the power amplifier 1020 and reflect about 10% to about 30% of the free-space in-cavity beam 1004 to seed further lasing. In the master oscillator ring 1010 the seed light continues from the beam splitter 1057 and travels through a first polarizing beam splitter 1014, Q-switch modulator 1015 driven by a pulsed driving voltage 1005, a second polarizing beam splitter 1016 (in some embodiments, the two polarizing beam splitters 1014 and 1016 are "crossed" such that the direction of polarization of one is 90 degrees rotated from that of the other), and further continues through second band-pass filter 1021 (e.g., a Fabry-Perot interferometer having an angle-adjustable wavelength selectivity) and is focused by lens 1022 into fused-silica endcap 1023 to enter optical fiber 1024.

In some embodiments, unidirectional propagation of free-space in-cavity signal beam 1004 is initiated by beam splitter 1057 in combination with high-reflectivity mirror 1056. The following example uses a beam splitter 1057 that has 30 percent reflectivity. When lasing is first commenced in optical fiber 1024, signal light can exit fiber 1024 in both the clockwise and counter-clockwise direction and signal light from both the clockwise and counter-clockwise direction will impinge on beam splitter 1057. Signal light propagating in the clockwise direction will encounter beam splitter 1057 and 70 percent of the light will be transmitted to the power amplifier 1020 and 30 percent of the light will be reflected and continue propagating the master oscillator 1010 in the clockwise direction. Signal light propagating in the counter-clockwise direction will encounter beam splitter 1057 and 30 percent of the light will be reflected and continue in the counter-clockwise direction and 70 percent will be transmitted and then reflected by high-reflectivity mirror 1056 back through beam splitter 1057. Of the reflected light, 30 percent will be reflected to the power amplifier 1020 and 70 percent will be transmitted into the master oscillator 1010 in the clockwise direction. After one pass through the beam splitter 1057, high-reflectivity mirror combination the signal light propagating in the clockwise direction is over two-and-a-half times greater than the signal light propagating in the counter-clockwise direction. This difference generates a preferential gain in the clockwise direction that leads to unidirectional propagation of the signal beam in the clockwise direction as shown in the figure.

In some embodiments, the wavelength spectrum of beam 1004 is narrowed and determined by band-pass filter 1053 (e.g., in some embodiments, a filter having a 0.7-nm-linewidth passband, such as a band-pass filter part number ACO-1064/5 Band-pass from Barr Associates, Inc., 2 Lyberty Way, Westford, Mass. 01886 USA, having a web address www-.barrassociates.com). In some embodiments, the pump light from pump laser 1009 counter-propagates relative to beam 1004, and is launched or combined (in the counter-clockwise direction in the figure) into the ring beam 1004 by dichroic beam splitter 1013 (e.g., in some embodiments, a dichroic beam splitter mirror, such as part number R980/T1064BS1.0 from Barr Associates, Inc.). In some embodiments, beam splitters 1014 and 1016 are polarizing beam-splitting (PBS) cubes (e.g., in some embodiments, part number PBS-1064-010 from CVI Laser, LLC). In some embodiments, PBS 1014 (in other embodiments, this beam splitter 1014 is a Glan-Thompson polarizer (walk-off) rather than part number PBS-1064-010) cleans up the polarization of the signal light before it enters modulator 1015 (e.g., an electro-optic RTP Q-switch), while the second PBS 1016 is used with the modulator 1015 to pass or block the signal beam 1004. In some embodiments, gain fiber 1024 is a polarizing/polarization-maintaining amplifying fiber, e.g., in some embodiments, one that includes two "stress rods," one on either side of its 25-micron core in a 250-micron-diameter fiber, to promote and maintain polarized amplification in the fiber. In some embodiments, the band-pass filter 1053 is a 0.7-nm-linewidth thin-film interferometer set at angle to select the desired wavelength (e.g., a filter that at a normal angle passes 1080-nm light, but set at an angle of about ten degrees, in order to pass 1064 nm.

In some embodiments, the pump light for power amplifier 1020 provided by power amplifier pump laser 1040 travels through the power amplifier optical fiber 1027, in a left-to-right direction as shown in the figure, to amplify the low-power infrared intermediate signal beam 1097 and exits the optical fiber 1027 through lens 1026. In some embodiments, power-amplifier seed light is blocked by the band-pass filter 1055 and the isolator 1019 from entering the master oscillator ring 1010. In some embodiments, isolator 1019 prevents signal wavelength from being reflected from the power amplifier 1020 into the master oscillator 1010. In some embodiments, amplified signal pulses from optical fiber 1027 (propagating in a right-to-left direction in FIG. 10) are collimated by lens 1028 and are transmitted by dichroic beam splitter 1029 to output as pulse beam 1098, which is focused by lens 1031 into non-linear crystal 1032 (e.g., a conventional frequency-doubling device that changes the output wavelength to half (e.g., in some embodiments, from 1064 nm to 532 nm), the frequency-doubled pulses are collimated by lens 1033 and output as pulsed beam 1099. In some embodiments, the high-power pulsed infrared intermediate beam 1098 is frequency doubled from 1064.4 nm (IR) to 532.2 nm (green) by a non-linear crystal such as lithium borate (LBO). In some embodiments, intermediate beam 1098 includes 5000 Watts pulses (up to 10 Watts continuous) or more, and up to 50 percent or more of the intermediate beam 1098 is converted to green light, resulting in green-light output of 2500 Watts peak (up to 5 Watts continuous) or more.

Figure 10B:
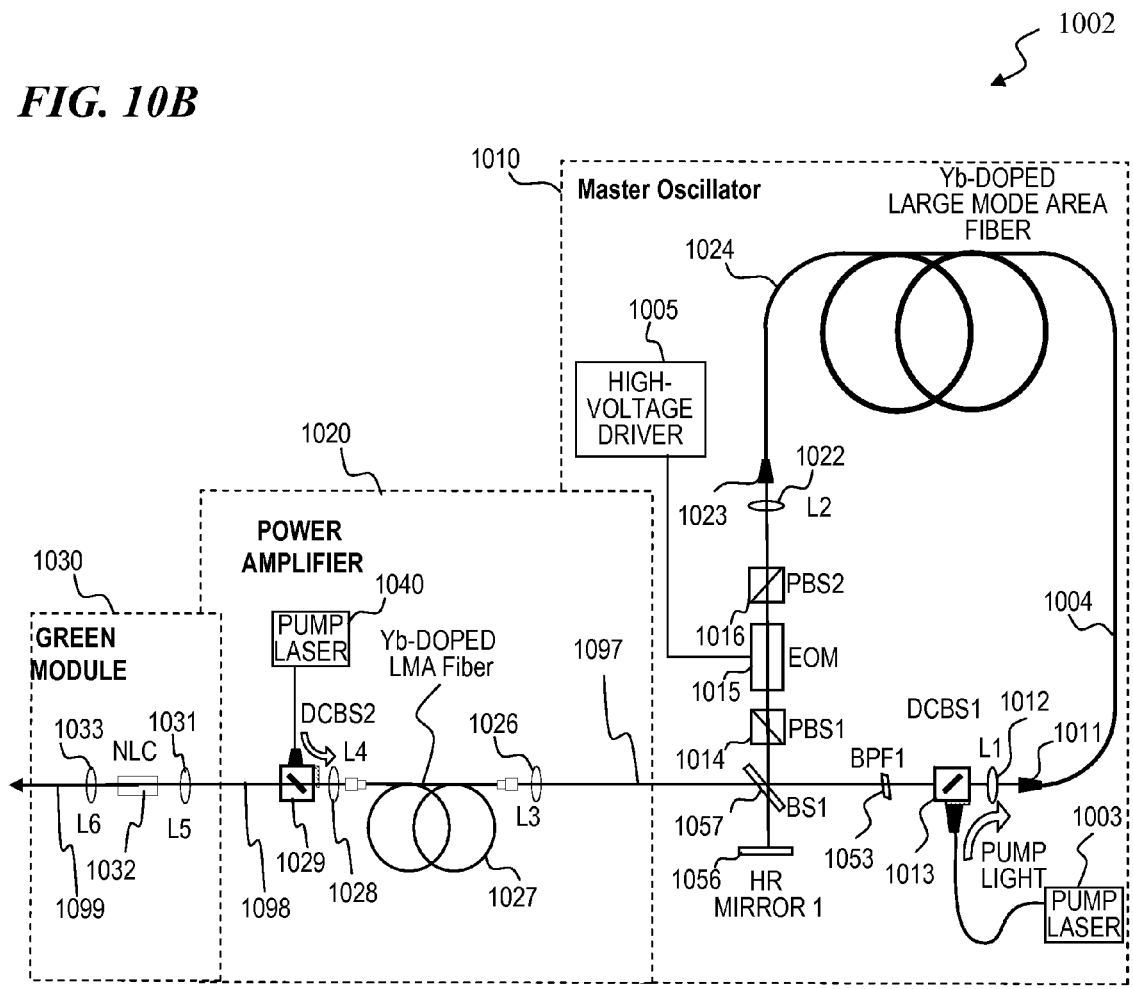
FIG. 10B is a block diagram of a visible-output system 1002 using an IR ring laser 1010.

FIG. 10B is a block diagram of a visible-output system 1002 using an IR ring laser 1010. System 1002 of FIG. 10B is substantially similar to system 1001 of FIG. 10A, except that mirror 1054 is omitted and its function replaced by orienting end 1011 of fiber 1024 at right angles to end 1023. Also in the embodiment shown, the isolator 1019 of FIG. 10A is omitted in FIG. 10B to lower cost when back reflections can be otherwise minimized by careful component placement.

Figure 11A:
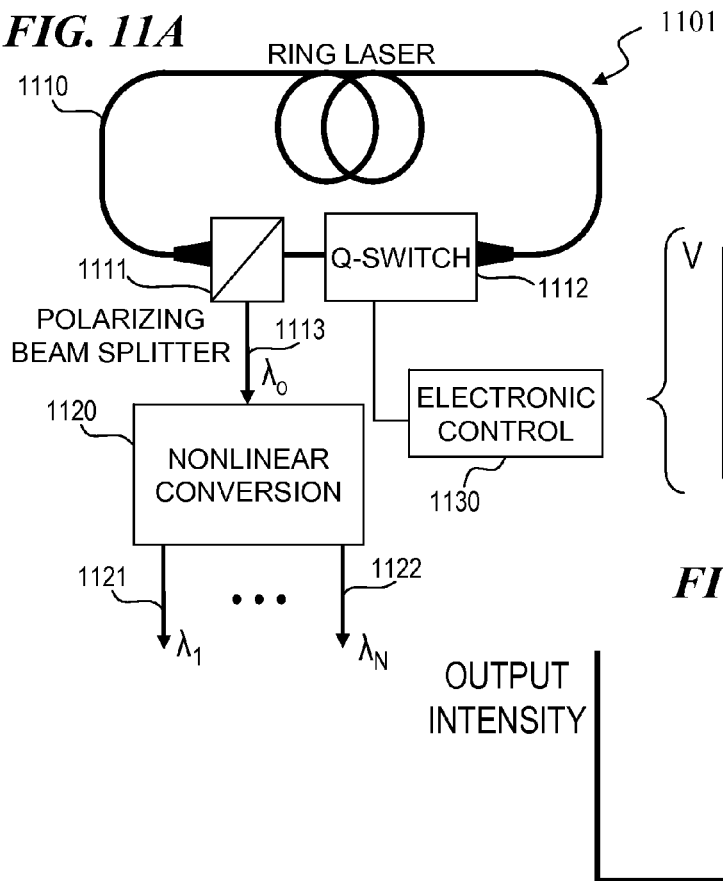
FIG. 11A is a block diagram of a multiple-wavelength-output system 1101 using an IR ring laser 1110.

FIG. 11A is a block diagram of a multiple-wavelength-output Q-switched ring-laser system 1101 using an IR ring laser 1110. In some embodiments, ring laser 1110 includes a rare-earth-doped gain fiber 1124, a Q-switch 1112 controlled by electronic controller 1130, and an output coupler 1111 (e.g., a polarizing beam splitter in some embodiments) that outputs an intermediate output beam 1113 having a wavelength of $\lambda_o$ that is processed by wavelength-conversion device 1120 (in some embodiments, a non-linear optical device, such as a wavelength doubler or OPO or other suitable device) that outputs one or more output wavelengths 1121-1122 (e.g., wavelengths $\lambda_1$ through $\lambda_N$).

Figure 11C:
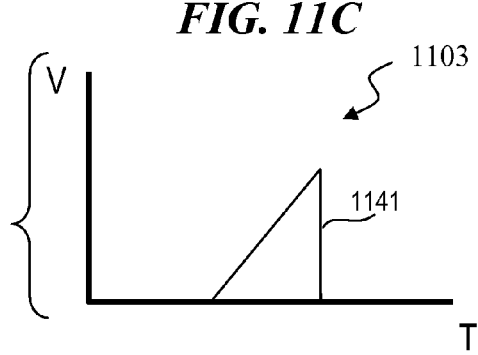
FIG. 11C is a graph 1103 of an electrical-pulse waveform 1141.
Figure 11D:
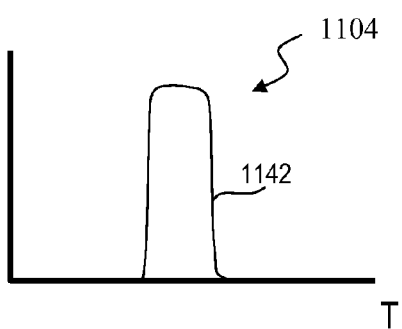
FIG. 11D is a graph 1104 of an optical-pulse waveform 1142.
Figure 11B:
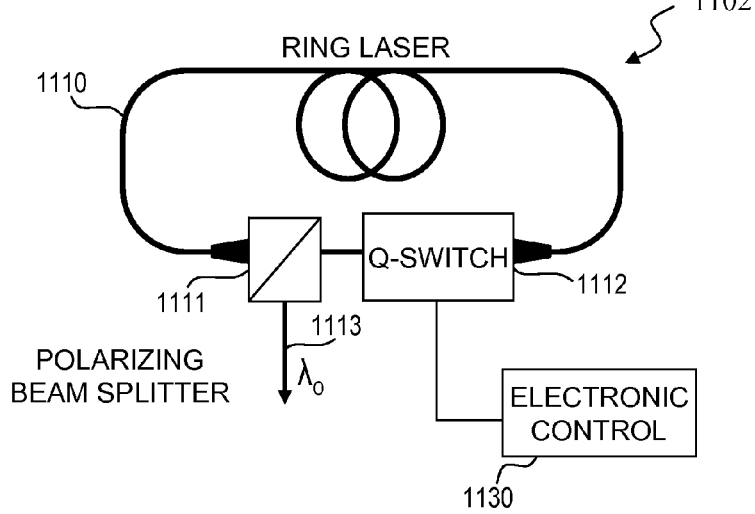
FIG. 11B is a block diagram of an IR-wavelength-output system 1102 using an IR ring laser 1110.

FIG. 11B is a block diagram of an IR-wavelength-output system 1102 using an IR ring laser 1110. System 1102 is identical to system 1101 of FIG. 11A, except that the wavelength-conversion device 1120 is omitted and intermediate beam 1113 is the output beam of the system 1102.

FIG. 11C is a graph 1103 of an electrical-pulse waveform 1141. In some embodiments, an electrical pulse having an amplitude that increases over time (a ramp shape, such as shown) is output from controller 1130 of FIG. 11A or 11B and used to drive Q-switch 1112, where the increasing amplitude of the electrical pulse gradually opens the Q-switch in a manner that compensated for the decrease in cavity gain (and/or external amplifier gain) over time.

FIG. 11D is a graph 1104 of an idealized optical-pulse waveform 1142 (representing the shape of pulses at output 1113 of the above figures, wherein the pulse shape is approximately "square" (substantially constant over the duration of the pulse) because of the compensating nature of the Q-switch driving voltage.

Figure 12:
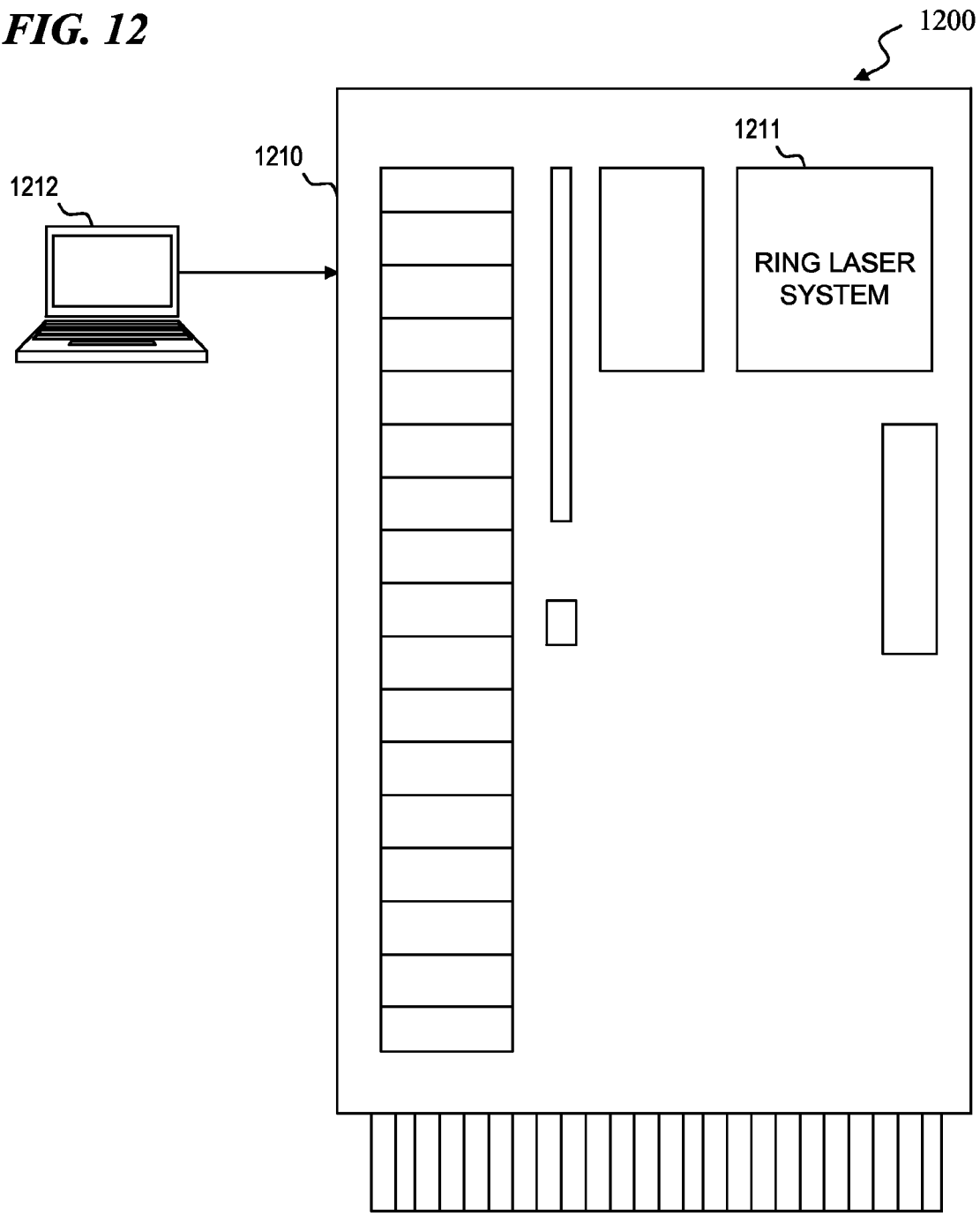
FIG. 12 is a block diagram of a materials processing system 1200 using one or more of the ring laser systems 1211 as described herein.

FIG. 12 is a block diagram of a materials processing system 1200 using one or more of the ring laser systems 1211 as described herein. In some embodiments, materials processing system 1200 includes a production unit 1210 that is controlled by one or more controllers 1212 and which uses the laser output of one or more ring laser systems 1211. In some embodiments, each ring laser system 1211 includes one or more of the designs exemplified by the systems described above and shown in FIGS. 1A through 11B. In various embodiments, the light output from the IR laser is used directly, while in other embodiments, the light output from the IR laser is an intermediate beam that is further wavelength converted by any of the wavelength-conversion devices described herein (such as a wavelength doubler or tripler, optical parametric generator (OPG), optical parametric oscillator (OPO), or operational parametric amplifier (OPA) or the like).

In some embodiments, the present invention provides high-power output pulses that can be used to cut, ablate, and/or cauterize soft tissue (such as may be needed for surgery on a human patient such as described in U.S. patent application Ser. No. 11/536,642 titled "APPARATUS AND METHOD FOR STIMULATION OF NERVES AND AUTOMATED CONTROL OF SURGICAL INSTRUMENTS," which in turn uses inventions described in U.S. patent application Ser. No. 11/257,793 titled "APPARATUS AND METHOD FOR OPTICAL STIMULATION OF NERVES AND OTHER ANIMAL TISSUE," U.S. patent application Ser. No. 11/536,639 titled "MINIATURE APPARATUS AND METHOD FOR OPTICAL STIMULATION OF NERVES AND OTHER ANIMAL TISSUE," and U.S. Provisional Patent Application Ser. No. 60/872,930 titled "APPARATUS AND METHOD FOR CHARACTERIZING OPTICAL SOURCES USED WITH HUMAN AND ANIMAL TISSUES." In other embodiments, the present invention provides high-power output pulses that can be used to create micropores with minimal thermal damage to soft tissue (such as may be needed for surgery on a human patient such as described in U.S. patent application Serial Number 12/077,083 titled "FRACTIONAL PHOTOLYSIS USING SUB-MICROSECOND PULSED FIBER LASER(S)" filed Mar. 13, 2008. In some embodiments, the present invention provides high-power output pulses that can be used to cut, ablate, and/or cauterize soft tissue (such as may be needed for surgery on a human patient such as described in U.S. patent application Ser. No. 12/050,937 titled "A METHOD AND MULTIPLE-MODE DEVICE FOR HIGH-POWER SHORT-PULSE-LASER ABLATION AND CW CAUTERIZATION OF BODILY TISSUES" filed Mar. 18, 2008.

In some embodiments, the present invention provides high-power output pulses that can be used to remove paint, machine via holes (small holes in electronic substrates or printed circuit boards (PCBs)), metal and/or semiconductor annealing, laser welding, semiconductor-memory repair (e.g., opening metal lines to connect and/or disconnect spare sections of memory for other sections that has errors, thus increasing the yield of usable chips in memory manufacture), laser trimming of precision resistors (e.g., for analog-to-digital converters and digital-to-analog converters), other materials processing and/or the like.

Some embodiments include a materials processing system having one or more of the laser systems described herein that is used to provide the laser energy for the materials processing operation.

In some embodiments, the present invention provides a method that includes optically pumping a fiber ring laser having a beam path; forming a free-space signal beam in the beam path of the fiber ring laser; Q-switching the free-space signal beam; and extracting an intermediate output beam from the free-space beam.

Some embodiments further include opto-isolating the signal beam to travel only in a single direction around the ring.

Some embodiments further include filtering the signal beam to limit a linewidth of the signal beam in the ring.

In some embodiments, the Q-switching is electronically controlled. In some such embodiments, a timing of a pulse is determined by the electronically controlled Q-switcher. In some embodiments, the Q-switching includes using a Pockels cell. In some embodiments, the Q-switching includes using a rubidium titanyl phosphate (RTP) Pockels cell.

Some embodiments further include polarizing the signal beam to a linear polarization on each of two sides of the RTP Pockels cell.

In some embodiments, the extracting of the intermediate output beam from the free-space beam includes using a polarizing beam splitter.

Some embodiments further include rotating a direction of polarization by an empirically-determined amount on both of two sides of the output polarizing beam splitter.

In some embodiments, the opto-isolating of the signal beam is done between the two rotatings of the direction of polarization.

Some embodiments further include wavelength converting the intermediate output beam to a wavelength different from a wavelength of the intermediate output beam.

Some embodiments further include opto-isolating the signal beam to travel only in a single direction around the ring; filtering the signal beam to a limit a linewidth of the signal beam in the ring, wherein the Q-switching includes using a rubidium titanyl phosphate (RTP) Pockels cell; polarizing the signal beam to a linear polarization on each of two sides of the RTP Pockels cell, wherein the extracting of the intermediate output beam from the free-space beam includes using a polarizing beam splitter; rotating a direction of polarization by 90 degrees on both of two sides of the polarizing beam splitter, wherein the opto-isolating of the signal beam is done between the two rotatings of the direction of polarization; and wavelength converting the intermediate output beam to a wavelength different from a wavelength of the intermediate output beam.

In some embodiments, the present invention provides an apparatus that includes fiber ring laser having a signal beam path, the fiber ring laser including an optically-pumped polarization-maintaining (PM) gain fiber that forms portion of the signal beam path; a pump port configured to guide pump light into the gain fiber; fiber-end optics at each of two ends of the gain fiber, the fiber-end optics forming a free-space portion of the signal beam path; a Q-switch in the free-space signal beam path; and extraction optics configured to obtain an intermediate output beam from the free-space beam.

Some embodiments further include an opto-isolator in the signal beam path configured to limit the signal beam to travel only in a single direction around the ring.

Some embodiments further include a wavelength filter in the free-space portion of the signal beam path configured to a limit a linewidth of the signal beam in the ring.

In some embodiments, the Q-switch includes a rubidium titanyl phosphate (RTP) Pockels cell.

Some embodiments further include two polarizers in the free-space portion of the signal beam path on each of two sides of the RTP Pockels cell to linearly polarize the signal beam on the two sides of the RTP Pockels cell.

In some embodiments, the extraction optics include a polarizing beam splitter.

Some embodiments further include a half-wave plate in the free-space portion of the signal beam path on each of two sides of the polarizing beam splitter.

In some embodiments, the opto-isolator is located between the two half-wave plates.

Some embodiments further include a wavelength-converting device optically coupled to receive the intermediate output beam and to convert a wavelength of the intermediate output beam to a wavelength different from the wavelength of the intermediate output beam.

Some embodiments further include opto-isolating the signal beam to travel only in a single direction around the ring; filtering the signal beam to a limit a linewidth of the signal beam in the ring, wherein the Q-switching includes using a rubidium titanyl phosphate (RTP) Pockels cell; polarizing the signal beam to a linear polarization on each of two sides of the RTP Pockels cell, wherein the extracting of the intermediate output beam from the free-space beam includes using a polarizing beam splitter; rotating a direction of polarization by 90 degrees on both of two sides of the polarizing beam splitter, wherein the opto-isolating of the signal beam is done between the two rotating of the direction of polarization; and wavelength converting the intermediate output beam to a wavelength different from a wavelength of the intermediate output beam.

In some embodiments, the present invention provides an apparatus that includes means for optically pumping a fiber ring laser having a beam path; means for forming a free-space signal beam in the beam path of the fiber ring laser; means for Q-switching the free-space signal beam; and means for extracting an intermediate output beam from the free-space beam.

Some embodiments further include means for opto-isolating the signal beam to travel only in a single direction around the ring.

Some embodiments further include means for filtering the signal beam to limit a linewidth of the signal beam in the ring.

In some embodiments, the means for Q-switching includes a rubidium titanyl phosphate (RTP) Pockels cell.

Some embodiments further include means for polarizing the signal beam to a linear polarization on each of two sides of the RTP Pockels cell.

In some embodiments, the means for extracting of the intermediate output beam from the free-space beam includes a polarizing beam splitter.

Some embodiments further include means for rotating a direction of polarization by 90 degrees on both of two sides of the polarizing beam splitter.

In some embodiments, the means for opto-isolating of the signal beam is located between the two rotators of the direction of polarization.

Some embodiments further include means for wavelength converting the intermediate output beam to a wavelength different from a wavelength of the intermediate output beam.

Some embodiments further include means for opto-isolating the signal beam to travel only in a single direction around the ring; means for filtering the signal beam to a limit a linewidth of the signal beam in the ring, wherein the Q-switching includes using a rubidium titanyl phosphate (RTP) Pockels cell; means for polarizing the signal beam to a linear polarization on each of two sides of the RTP Pockels cell, wherein the extracting of the intermediate output beam from the free-space beam includes using a polarizing beam splitter; means for rotating a direction of polarization by 90 degrees on both of two sides of the polarizing beam splitter, wherein the opto-isolating of the signal beam is done between the two rotatings of the direction of polarization; and means for wavelength converting the intermediate output beam to a wavelength different from a wavelength of the intermediate output beam.

In some embodiments, one or more of the gain fiber(s) of each embodiment includes a photonic-crystal fiber (PCF) or photonic-crystal rod (PCR). In some such embodiments, the PCF or PCR is polarization maintaining (PM). In some embodiments, one or more of the gain fiber(s) of each embodiment includes a large-mode-area (LMA) fiber (e.g., in some embodiments, the mode field diameter in the fiber is larger than about 12 microns, while in other embodiments, the mode field diameter in the fiber is larger than about 25 microns, the mode field diameter in the fiber is larger than about 50 microns, the mode field diameter in the fiber is larger than about 75 microns, or the mode field diameter in the fiber is larger than about 100 microns). In some such embodiments, the LMA fiber is polarization maintaining (PM). In some embodiments, the LMA fiber has a numerical aperture (NA) of no more than about 0.15, while in other embodiments, the LMA fiber has a numerical aperture (NA) of no more than about 0.12, the LMA fiber has a numerical aperture (NA) of no more than about 0.10, the LMA fiber has a numerical aperture (NA) of no more than about 0.08, or the LMA fiber has a numerical aperture (NA) of no more than about 0.06.

In some embodiments, the amplified IR output beams (either from a power oscillator or from a MOPA) include pulses of at least 5 KW and an average power of at least 10 W. Some embodiments use a plurality of gain stages, which, in some embodiments, are each separated by an isolator (a one-way optical element to prevent backward-traveling light) and/or a narrow-band filter (to reduce amplifier spontaneous emission (ASE) and/or clean up the signal pulses). In some embodiments, one or more of the power amplifier stages use a photonic-crystal fiber (PCF) or photonic-crystal rod (PCR) as described in U.S. patent application Ser. No. 11/420,729 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD", which is incorporated herein in its entirety by reference. In some embodiments, one or more of the power amplifier stages use a non-photonic-crystal fiber having a large mode area (LMA) that has a mode-field diameter of at least about 12 microns, while other embodiments use an LMA fiber that has a mode-field diameter of at least about 20 microns, an LMA fiber that has a mode-field diameter of at least about 40 microns, an LMA fiber that has a mode-field diameter of at least about 60 microns, an LMA fiber that has a mode-field diameter of at least about 80 microns, or an LMA fiber that has a mode-field diameter of at least about 100 microns. In some embodiments, the amplified IR output beams include pulses of at least 1 KW. In other embodiments, the amplified IR output beams include pulses of at least 2.5 KW. In other embodiments, the amplified IR output beams include pulses of at least 5 KW. In other embodiments, the amplified IR output beams include pulses of at least 10 KW. In other embodiments, the amplified IR output beams include pulses of at least 25 KW. In other embodiments, the amplified IR output beams include pulses of at least 50 KW. In other embodiments, the amplified IR output beams include pulses of at least 100 KW. In other embodiments, the amplified IR output beams include pulses of at least 250 KW. In other embodiments, the amplified IR output beams include pulses of at least 500 KW. In other embodiments, the amplified IR output beams include pulses of at least 1000 KW. In other embodiments, the amplified IR output beams include pulses of at least 10 KW and an average power of at least 20 W. In some of each of these embodiments, the amplified IR output beam is polarized (in some embodiments, this polarization makes the non-linear conversion to other wavelengths more efficient).

In some embodiments, the wavelength-conversion device includes apparatus and methods such as described in U.S. patent application Ser. No. 11/558,362 titled "ULTRAVIOLET LASER SYSTEM AND METHOD HAVING WAVELENGTH IN THE 200-NM RANGE", which is incorporated herein in its entirety by reference. In some embodiments, the wavelength-converted beams include output pulses of at least 2.5 KW and an average power of at least 5 W. In other embodiments, the wavelength-converted beams include output pulses of at least 1.25 KW and an average power of at least 2.5 W. In other embodiments, the wavelength-converted beams include output pulses of at least 5 KW and an average power of at least 10 W. In other embodiments, the wavelength-converted beams include output pulses of at least 25 KW. In other embodiments, the wavelength-converted beams include output pulses of at least 50 KW. In other embodiments, the wavelength-converted beams include output pulses of at least 100 KW. In other embodiments, the wavelength-converted beams include output pulses of at least 250 KW. In other embodiments, the wavelength-converted beams include output pulses of at least 500 KW. In some of each of the above embodiments in this paragraph, the wavelength-converted beams include wavelengths that are one-half the wavelength of the amplified IR output beams (e.g., a wavelength-converted wavelength of 532 nm if the IR wavelength is 1064 nm). In some of each of the above embodiments in this paragraph, the wavelength-converted beams include wavelengths that are one-third the wavelength of the amplified IR output beams (e.g., a wavelength-converted wavelength of about 355 nm if the IR wavelength is 1064 nm). In some of each of the above embodiments in this paragraph, the wavelength-converted beams include wavelengths that are one-quarter the wavelength of the amplified IR output beams (e.g., a wavelength-converted wavelength of 266 nm if the IR wavelength is 1064 nm). In some of each of the above embodiments in this paragraph, the wavelength-converted beams include wavelengths that are one-fifth the wavelength of the amplified IR output beams (e.g., a wavelength-converted wavelength of about 213 nm if the IR wavelength is 1064 nm). In some of each of the above embodiments in this paragraph, the wavelength-converted beams include wavelengths that are one-sixth the wavelength of the amplified IR output beams (e.g., a wavelength-converted wavelength of about 177 nm if the IR wavelength is 1064 nm).

In some embodiments, one or more of the gain fiber(s) of each embodiment includes a single-mode fiber (SMF) or a multi-mode fiber (MMF).

In some embodiments, the present invention provides a method that includes providing a fiber gain medium; configuring an optical signal path that extends through the fiber gain medium such that the optical path forms a ring laser having a signal beam; optically pumping the fiber gain medium; forming a free-space signal beam in the optical signal path of the ring laser; Q-switching the free-space signal beam outside the fiber; and extracting, from the free-space signal beam, an intermediate optical signal output beam having a first wavelength.

Some embodiments further include forcing a majority of the signal beam to travel in a first direction around the ring laser.

Some embodiments further include wavelength filtering the signal beam to limit a linewidth of the signal beam in the ring laser.

In some embodiments, the Q-switching includes polarizing the signal beam, rotating an angle of polarization of the polarized signal beam, and again polarizing the polarization-rotated signal beam.

Some embodiments further include preferentially amplifying signal light having a first linear polarization direction in the fiber gain medium.

In some embodiments, the extracting of the intermediate optical signal output beam from the free-space signal beam includes using a polarizing beam splitter to split the free-space signal beam into the intermediate optical signal output beam and a ring-feedback signal beam.

Some embodiments further include rotating a direction of polarization of the signal beam by a non-zero amount on both of two sides of the polarizing beam splitter, wherein the non-zero amount determines proportions of the intermediate optical signal output beam and the ring-feedback signal beam.

In some embodiments, the forcing of the majority of the signal beam to travel in a first direction is performed between the two rotatings of the direction of polarization.

Some embodiments further include frequency doubling the intermediate optical signal output beam to form a second signal output beam having a second wavelength that is one-half of the first wavelength of the intermediate optical signal output beam.

Some embodiments further include forcing the signal beam to travel in a first direction around the ring laser; filtering the signal beam to limit a linewidth of the signal beam in the ring laser, wherein the Q-switching includes using a rubidium titanyl phosphate (RTP) Pockels cell; polarizing the signal beam to a linear polarization on each of two sides of the RTP Pockels cell, wherein the extracting of the intermediate optical signal output beam from the free-space signal beam includes using a polarizing beam splitter; rotating a direction of polarization by 90 degrees on both of two sides of the polarizing beam splitter, wherein the forcing of a majority of the signal beam is done between the two rotatings of the direction of polarization; and wavelength converting the intermediate optical signal output beam to a wavelength different from the first wavelength of the intermediate optical signal output beam.

In some embodiments, the present invention provides an apparatus that includes a ring laser that has an optical signal ring path and further has a signal beam that propagates the ring laser, the ring laser including an optically-pumped gain fiber that forms a first portion of the optical signal ring path; a pump port configured to guide pump light into the gain fiber; fiber-end optics at a first end of the gain fiber and fiber-end optics at a second end of the gain fiber, the first and second fiber-end optics configured to form a free-space second portion of the optical signal ring path between the first end and the second end of the gain fiber such that a free-space signal beam propagates in the free-space second portion of the optical signal ring path; a Q-switch in the free-space second portion of the optical signal ring path; and extraction optics configured to obtain an intermediate output beam from the free-space signal beam.

Some embodiments further include a first optical component in the free-space second portion of the optical signal ring path configured to force a majority of the free-space signal beam to travel in a first direction around the ring laser.

Some embodiments further include a wavelength filter located in the free-space second portion of the optical signal ring path configured to limit a linewidth of the signal beam in the ring laser.

In some embodiments, the Q-switch includes an electrical control configured to control a timing of signal pulses.

In some embodiments, the Q-switch further comprises a Pockels cell; and a polarizer in the free-space second portion of the optical signal ring path on each of two sides of the Pockels cell to linearly polarize the signal beam on the two sides of the Pockels cell.

In some embodiments, the extraction optics include a polarizing beam splitter.

Some embodiments further include a first half-wave plate in the free-space portion of the signal beam path on a first side of the polarizing beam splitter, and a second half-wave plate in the free-space portion of the signal beam path on a first side of the polarizing beam splitter, wherein the first and second half-wave plates are adjustable to control a proportion of the free-space signal beam that is output and to align a polarization of a ring-feedback signal beam to that of the gain fiber.

In some embodiments, the gain fiber is a polarization-maintaining (PM) gain fiber.

Some embodiments further include a wavelength-converting device optically coupled to receive the intermediate output beam and to convert a wavelength of the intermediate output beam to a wavelength different from the wavelength of the intermediate output beam.

Some embodiments further include opto-isolating the signal beam to travel only in a single direction around the ring; filtering the signal beam to a limit a linewidth of the signal beam in the ring laser, wherein the Q-switching includes using a rubidium titanyl phosphate (RTP) Pockels cell; polarizing the signal beam to a linear polarization on each of two sides of the RTP Pockels cell, wherein the extracting of the intermediate output beam from the free-space beam includes using a polarizing beam splitter; rotating a direction of polarization by 90 degrees on both of two sides of the polarizing beam splitter, wherein the opto-isolating of the signal beam is done between the two rotating of the direction of polarization; and wavelength converting the intermediate output beam to a wavelength different from a wavelength of the intermediate output beam.

In some embodiments, the present invention provides an apparatus that includes a fiber gain medium that is configured to form a first portion of an optical signal ring path that extends through the fiber gain medium such that the optical signal ring path forms a ring laser having a signal beam; means, as described herein, for optically pumping the fiber gain medium; means, as described herein, for forming a free-space signal beam in the optical signal ring path; means, as described herein, for Q-switching the free-space signal beam; and means, as described herein, for extracting an intermediate output beam from the free-space signal beam.

Some embodiments further include means for forcing the signal beam to travel in a first direction around the ring laser.

Some embodiments further include means for filtering the signal beam to limit a linewidth of the signal beam in the ring laser.

In some embodiments, the means for Q-switching is configured to pass light based on an electrical control signal.

Some embodiments further include a rubidium titanyl phosphate (RTP) Pockels cell; and means for polarizing the signal beam to a linear polarization on each of two sides of a RTP Pockels cell.

In some embodiments, the means for extracting of the intermediate output beam from the free-space beam includes means for polarizing beam splitter.

Some embodiments further include means for rotating a direction of polarization by 90 degrees on both of two sides of the polarizing beam splitter.

In some embodiments, the means for Q-switching includes means for passing light based on an electrical control signal, wherein the means for extracting of the intermediate output beam from the free-space beam includes means for polarizing beam splitter, wherein the gain fiber is a polarization-maintaining (PM) gain fiber, and wherein the apparatus further includes means for forcing the signal beam to travel in a first direction around the ring laser; and means for filtering the signal beam to limit a linewidth of the signal beam in the ring laser.

Some embodiments further include means for wavelength converting the intermediate output beam to a wavelength different from a wavelength of the intermediate output beam.

Some embodiments further include means for opto-isolating the signal beam to travel only in a single direction around the ring; means for filtering the signal beam to a limit a linewidth of the signal beam in the ring, wherein the Q-switching includes using a rubidium titanyl phosphate (RTP) Pockels cell; means for polarizing the signal beam to a linear polarization on each of two sides of the RTP Pockels cell, wherein the extracting of the intermediate output beam from the free-space beam includes using a polarizing beam splitter; means for rotating a direction of polarization by 90 degrees on both of two sides of the polarizing beam splitter, wherein the opto-isolating of the signal beam is done between the two rotatings of the direction of polarization; and means for wavelength converting the intermediate output beam to a wavelength different from a wavelength of the intermediate output beam.

Some embodiments of the apparatus described herein further include a materials-processing unit operably coupled to receive laser output energy from one or more of the ring laser systems and/or wavelength conversion devices and configured to use the laser output energy for materials-processing functions.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   providing a rare-earth doped large-mode-area (LMA) fiber gain medium;
   configuring an optical signal path that extends through the fiber gain medium such that the optical path forms a ring laser having a signal beam;
   optically pumping the rare-earth doped LMA fiber gain medium;
   forming a free-space signal beam in the optical signal path of the ring laser;
   Q-switching the free-space signal beam outside the rare-earth doped LMA fiber gain medium at a timing controlled by an electrical signal;
   extracting, from the free-space signal beam, an intermediate optical signal pulsed output beam having a first wavelength, wherein the Q-switching of the pulsed output beam is controlled by the electrical signal during normal operation of the extracting of the pulsed output signal and independent of cavity length; and
   wavelength converting the intermediate optical signal output beam to form a second signal output beam having a second wavelength that is different from the first wavelength of the intermediate optical signal output beam, wherein the second signal output beam has a power of at least 2500 Watts.

2. The method of claim 1, further comprising:
   forcing a majority of the signal beam to travel in a first direction around the ring laser.

3. The method of claim 2, wherein the extracting of the intermediate optical signal output beam from the free-space signal beam includes using a polarizing beam splitter to split the free-space signal beam into the intermediate optical signal output beam and a ring-feedback signal beam.

4. The method of claim 3, further comprising:
   rotating a direction of polarization of the signal beam by a non-zero amount on both of two sides of the polarizing beam splitter, wherein the non-zero amount determines proportions of the intermediate optical signal output beam and the ring-feedback signal beam.

5. The method of claim 4, wherein the forcing of the majority of the signal beam to travel in a first direction is performed between the two rotatings of the direction of polarization.

6. The method of claim 1, further comprising:
   wavelength filtering the signal beam to limit a linewidth of the signal beam in the ring laser.

7. The method of claim 1, wherein the Q-switching includes polarizing the signal beam, rotating an angle of polarization of the polarized signal beam, and again polarizing the polarization-rotated signal beam.

8. The method of claim 1, further comprising preferentially amplifying signal light having a first linear polarization direction in the fiber gain medium.

9. The method of claim 1, wherein the wavelength converting includes frequency doubling the intermediate optical signal output beam such that the second wavelength of the second signal output beam is one-half of the first wavelength of the intermediate optical signal output beam.

10. The method of claim 1, wherein the Q-switching is one operational mode of a plurality of operational modes of the free-space signal beam, and wherein the plurality of operational modes further includes a continuous-wave operational mode.

11. The method of claim 1, wherein the method further includes:
   performing a materials-processing function using energy from the intermediate optical signal output beam.

12. The method of claim 1, wherein the wavelength converting includes frequency doubling the intermediate optical signal output beam such that the second wavelength of the second signal output beam is one-half of the first wavelength of the intermediate optical signal output beam; and wherein the method further includes performing a materials-processing function using energy from the second signal output beam.

13. The method of claim 1, wherein the Q-switching includes applying a ramped control pulse to a Q-switch optical modulator for adjusting a temporal shape of the intermediate signal pulsed output beam.

14. A method comprising:

providing a fiber gain medium;

configuring an optical signal path that extends through the fiber gain medium such that the optical path forms a ring laser having a signal beam;

optically pumping the fiber gain medium;

forming a free-space signal beam in the optical signal path of the ring laser;

Q-switching the free-space signal beam outside the fiber;

extracting, from the free-space signal beam, an intermediate optical signal output beam having a first wavelength;

forcing the signal beam to travel in a first direction around the ring laser;

filtering the signal beam to limit a linewidth of the signal beam in the ring laser, wherein the Q-switching includes using a rubidium titanyl phosphate (RTP) Pockels cell;

polarizing the signal beam to a linear polarization on each of two sides of the RTP Pockels cell, wherein the extracting of the intermediate optical signal output beam from the free-space signal beam includes using a polarizing beam splitter;

rotating a direction of polarization by an amount greater than 45 degrees and less than 90 degrees on both of two sides of the polarizing beam splitter, wherein the forcing of a majority of the signal beam is done between the two rotatings of the direction of polarization; and wavelength converting the intermediate optical signal output beam to a wavelength different from the first wavelength of the intermediate optical signal output beam.

15. An apparatus comprising:

a ring laser that has an optical signal ring path and further has a signal beam that propagates the ring laser, the ring laser including an optically-pumped rare-earth doped large-mode-area (LMA) gain fiber that forms a first portion of the optical signal ring path;

a pump port configured to guide pump light into the rare-earth doped LMA gain fiber;

fiber-end optics at a first end of the rare-earth doped LMA gain fiber and fiber-end optics at a second end of the rare-earth doped LMA gain fiber, the first and second fiber-end optics configured to form a free-space second portion of the optical signal ring path between the first end and the second end of the rare-earth doped LMA gain fiber such that a free-space signal beam propagates in the free-space second portion of the optical signal ring path;

a Q-switch in the free-space second portion of the optical signal ring path, wherein a timing of the Q-switch is controlled by an electrical signal;

extraction optics configured to obtain an intermediate output beam from the free-space signal beam, wherein the electrical signal controls the timing of the Q-switch during normal operation of the extraction optics and independent of cavity length; and a wavelength-converting device optically coupled to receive the intermediate output beam and configured to form a second output beam that has a second wavelength different from a first wavelength of the intermediate output beam.

16. The apparatus of claim 15, further comprising:

a first optical component in the free-space second portion of the optical signal ring path configured to force a majority of the free-space signal beam to travel in a first direction around the ring laser.

17. The apparatus of claim 15, further comprising:

a wavelength filter located in the free-space second portion of the optical signal ring path configured to limit a linewidth of the signal beam in the ring laser.

18. The apparatus of claim 15, wherein the Q-switch includes an electrical control configured to control a timing of signal pulses.

19. The apparatus of claim 15, further comprising a materials-processing unit operably coupled to receive laser output energy from the ring laser and configured to use the laser output energy for materials-processing functions.

20. The apparatus of claim 19, further comprising:

a first half-wave plate in the free-space portion of the signal beam path on a first side of the polarizing beam splitter, and a second half-wave plate in the free-space portion of the signal beam path on a second side of the polarizing beam splitter, wherein the first and second half-wave plates are adjustable to control a proportion of the free-space signal beam that is output and to align a polarization of a ring-feedback signal beam to that of the gain fiber.

21. The apparatus of claim 15, wherein the gain fiber is a polarization-maintaining (PM) gain fiber.

22. The apparatus of claim 15, further comprising a wavelength-conversion device coupled to receive the intermediate output beam, wherein the ring laser is configured to operate in a plurality of modes including a Q-switching mode and a continuous-wave mode.

23. The apparatus of claim 15, wherein the ring laser is configured to operate in a plurality of modes including a Q-switching mode and a continuous-wave mode.

24. The apparatus of claim 15, wherein the second signal output beam has a power of at least 2500 Watts.

25. The apparatus of claim 15, wherein the wavelength-converting device is configured to frequency double the intermediate output beam such that the second wavelength of the second signal output beam is one-half of the first wavelength of the intermediate output beam, and wherein the second signal output beam has a power of at least 2500 Watts.

26. The apparatus of claim 15, wherein the wavelength-converting device includes an optical parametric oscillator (OPO) that outputs light having at least two wavelengths other than the first wavelength of the intermediate output beam.

27. An apparatus comprising:

a ring laser that has an optical signal ring path and further has a signal beam that propagates the ring laser, the ring laser including an optically-pumped gain fiber that forms a first portion of the optical signal ring path;

a pump port configured to guide pump light into the gain fiber;

fiber-end optics at a first end of the gain fiber and fiber-end optics at a second end of the gain fiber, the first and second fiber-end optics configured to form a free-space second portion of the optical signal ring path between the first end and the second end of the gain fiber such that a free-space signal beam propagates in the free-space second portion of the optical signal ring path;
a Q-switch in the free-space second portion of the optical signal ring path; and
extraction optics configured to obtain an intermediate output beam from the free-space signal beam, wherein the Q-switch includes an electrical control configured to control a timing of signal pulses, and wherein the Q-switch further comprises:
a Pockels cell; and
a polarizer in the free-space second portion of the optical signal ring path on each of two sides of the Pockels cell to linearly polarize the signal beam on the two sides of the Pockels cell, and wherein the extraction optics include a polarizing beam splitter.

28. The apparatus of claim 27, further comprising a materials-processing unit operably coupled to receive laser output energy from the ring laser and configured to use the laser output energy for materials-processing functions.

29. The apparatus of claim 27, further comprising a wavelength-conversion device coupled to receive the intermediate output beam, wherein the ring laser is operable in each one of a plurality of operational modes, wherein the plurality of operational modes includes a Q-switching mode and a continuous-wave mode.

30. The apparatus of claim 29, wherein the wavelength-conversion device is configured to frequency double the intermediate output beam such that an output beam having a wavelength of about 532 nm is generated.

31. An apparatus comprising:
a ring laser that has an optical signal ring path and further has a signal beam that propagates the ring laser, the ring laser including an optically-pumped gain fiber that forms a first portion of the optical signal ring path;
a pump port configured to guide pump light into the gain fiber;
fiber-end optics at a first end of the gain fiber and fiber-end optics at a second end of the gain fiber, the first and second fiber-end optics configured to form a free-space second portion of the optical signal ring path between the first end and the second end of the gain fiber such that a free-space signal beam propagates in the free-space second portion of the optical signal ring path;
a Q-switch in the free-space second portion of the optical signal ring path;
extraction optics configured to obtain an intermediate output beam from the free-space signal beam;
an optical unit configured to constrain the signal beam to travel only in a single direction around the ring;
a wavelength bandpass filter configured to filter the signal beam to a limit a linewidth of the signal beam in the ring laser, wherein the Q-switch includes a rubidium titanyl phosphate (RTP) Pockels cell;
a polarizer configured to polarize the signal beam to a linear polarization on each of two sides of the RTP Pockels cell, wherein the extracting of the intermediate output beam from the free-space beam includes using a polarizing beam splitter;
a waveplate configured to rotate a direction of polarization by an amount greater than 45 degrees and less than 90 degrees on both of two sides of the polarizing beam splitter, wherein the opto-isolating of the signal beam is done between the two rotating of the direction of polarization; and
a wavelength converter configured to wavelength convert the intermediate output beam to a wavelength different from a wavelength of the intermediate output beam.

32. An apparatus comprising:
a rare-earth doped large-mode-area (LMA) fiber gain medium that is configured to form a first portion of an optical signal ring path that extends through the fiber gain medium such that the optical signal ring path forms a ring laser having a signal beam;
means for optically pumping the fiber gain medium;
means for forming a free-space signal beam in the optical signal ring path;
means for Q-switching the free-space signal beam at a timing controlled by an electrical signal;
means for extracting an intermediate output beam from the free-space signal beam, wherein the means for Q-switching the free-space signal beam is controlled by the electrical signal during normal operation of the means for extracting and independent of cavity length; and
means for wavelength converting the intermediate output beam to form a second signal output beam having a second wavelength that is different from the first wavelength of the intermediate signal output beam.

33. The apparatus of claim 32, further comprising:
means for forcing the signal beam to travel in a first direction around the ring laser.

34. The apparatus of claim 33, wherein the means for extracting of the intermediate output beam from the free-space beam includes means for polarizing beam splitting.

35. The apparatus of claim 32, further comprising:
means for filtering the signal beam to limit a linewidth of the signal beam in the ring laser.

36. The apparatus of claim 32, wherein the means for Q-switching is configured to pass light based on an electrical control signal.

37. The apparatus of claim 32, the means for Q-switching further comprising:
a rubidium titanyl phosphate (RTP) Pockels cell; and
means for polarizing the signal beam to a linear polarization on each of two sides of the RTP Pockels cell.

38. The apparatus of claim 32, wherein the means for Q-switching includes means for passing light based on an electrical control signal, wherein the means for extracting of the intermediate output beam from the free-space beam includes means for polarizing beam splitting, wherein the fiber gain medium includes a polarization-maintaining (PM) gain fiber, and wherein the apparatus further comprises:
means for forcing the signal beam to travel in a first direction around the ring laser; and
means for filtering the signal beam to limit a linewidth of the signal beam in the ring laser.

39. The apparatus of claim 32, wherein the means for Q-switching the free-space signal beam is operable in one of a plurality of operational modes, and wherein the plurality of operational modes includes a continuous-wave mode and a Q-switched mode of the free-space signal beam.

40. The apparatus of claim 32, wherein the means for wavelength converting the intermediate output includes means for frequency doubling the intermediate output beam such that the second wavelength of the second signal output beam is one-half of the first wavelength of the intermediate output beam, and wherein the second signal output beam has a power of at least 2500 Watts.

41. An apparatus comprising:
a fiber gain medium that is configured to form a first portion of an optical signal ring path that extends through the fiber gain medium such that the optical signal ring path forms a ring laser having a signal beam;
means for optically pumping the fiber gain medium;

means for forming a free-space signal beam in the optical signal ring path;

means for Q-switching the free-space signal beam;

means for extracting an intermediate output beam from the free-space signal beam; and means for forcing the signal beam to travel in a first direction around the ring laser, wherein the means for extracting of the intermediate output beam from the free-space beam includes means for polarizing beam splitting, the apparatus further comprising:

means for rotating a direction of polarization by an amount greater than 45 degrees and less than 90 degrees on both of two sides of the means for polarizing beam splitting.

42. An apparatus comprising:

a fiber gain medium that is configured to form a first portion of an optical signal ring path that extends through the fiber gain medium such that the optical signal ring path forms a ring laser having a signal beam;

means for optically pumping the fiber gain medium;

means for forming a free-space signal beam in the optical signal ring path;

means for Q-switching the free-space signal beam;

means for extracting an intermediate output beam from the free-space signal beam;

means for opto-isolating the signal beam to travel only in a single direction around the ring;

means for filtering the signal beam to a limit a linewidth of the signal beam in the ring, wherein the Q-switching includes using a rubidium titanyl phosphate (RTP) Pockels cell;

means for polarizing the signal beam to a linear polarization on each of two sides of the RTP Pockels cell, wherein the extracting of the intermediate output beam from the free-space beam includes using a polarizing beam splitter;

means for rotating a direction of polarization by an amount greater than 45 degrees and less than 90 degrees on both of two sides of the polarizing beam splitter, wherein the opto-isolating of the signal beam is done between the two rotatings of the direction of polarization; and means for wavelength converting the intermediate output beam to a wavelength different from a wavelength of the intermediate output beam.

43. An apparatus comprising:

a fiber gain medium that is configured to form a first portion of an optical signal ring path that extends through the fiber gain medium such that the optical signal ring path forms a ring laser having a signal beam;

means for optically pumping the fiber gain medium;

means for forming a free-space signal beam in the optical signal ring path;

means for Q-switching the free-space signal beam at a timing controlled by an electrical signal; and means for extracting an intermediate output beam from the free-space signal beam, wherein the means for Q-switching the free-space signal beam is controlled by the electrical signal during normal operation of the means for extracting and independent of cavity length, wherein the means for Q-switching the free-space signal beam is operable in one of a plurality of operational modes, wherein the plurality of operational modes includes a continuous-wave mode and a Q-switched mode of the free-space signal beam, and wherein the wavelength-conversion device is configured to frequency double the intermediate output beam such that an output beam having a wavelength of about 532 nm is generated.

\* \* \* \* \*